(12) United States Patent
Shaffer et al.

(10) Patent No.: US 12,286,817 B2
(45) Date of Patent: Apr. 29, 2025

(54) RETENTION PATIO LEASH FOR PATIO FURNITURE

(71) Applicant: Patio Leash LLC, Vonore, TN (US)

(72) Inventors: Robert William Shaffer, Vonore, TN (US); Christie L. Shaffer, Vonore, TN (US)

(73) Assignee: Patio Leash LLC, Vonore, TN (US)

( * ) Notice: Subject to any disclaimer, the term of this patent is extended or adjusted under 35 U.S.C. 154(b) by 0 days.

(21) Appl. No.: 18/422,707

(22) Filed: Jan. 25, 2024

(65) Prior Publication Data

US 2024/0159086 A1 May 16, 2024

Related U.S. Application Data

(63) Continuation-in-part of application No. 17/814,669, filed on Jul. 25, 2022, now Pat. No. 11,946,271.
(Continued)

(51) Int. Cl.
*E05B 73/00* (2006.01)
*B60P 7/08* (2006.01)
(Continued)

(52) U.S. Cl.
CPC ........ *E05B 73/0011* (2013.01); *B60P 7/0823* (2013.01); *A01K 1/04* (2013.01);
(Continued)

(58) Field of Classification Search
CPC . E04H 12/2238; E04H 12/2269; A45B 23/00; A45B 2023/0012; A45B 2200/1009; B61D 45/00; A62B 35/0068; A62B 35/0075; B60P 7/0807; B60P 7/0846; B60P 7/0823; B60P 3/079; E01F 13/028;
(Continued)

(56) References Cited

U.S. PATENT DOCUMENTS 184,663 A * 11/1876 Reichert ................. A45F 5/004
242/379.2
586,480 A * 7/1897 Ebersol .................... A01K 1/04
119/780
(Continued)

FOREIGN PATENT DOCUMENTS

DE 29813048 U1 * 4/1999 ............. A45C 13/20
EP 2851489 3/2015
(Continued)

*Primary Examiner* — Taylor Morris
(74) *Attorney, Agent, or Firm* — Merchant & Gould P.C.

(57) ABSTRACT

A retention patio leash for outdoor furniture includes a housing having a first end and an opposite second end. The housing includes a first collar disposed at the first end and a second collar disposed at the second end. The first and second collars defining a through opening configured to receive at least a portion of the outdoor furniture. An intermediate disc body is disposed between the first collar and the second collar, the intermediate disc body defining an internal cavity and a plurality of slots defined on a sidewall. A retention system is supported within the intermediate disc body and includes one or more retractable straps and a fastener coupled to a free end of each of the one or more retractable straps. The fastener configured to releasably attach to other outdoor furniture.

20 Claims, 17 Drawing Sheets

Related U.S. Application Data

(60) Provisional application No. 63/441,889, filed on Jan. 30, 2023, provisional application No. 63/203,556, filed on Jul. 27, 2021.

(51) Int. Cl.
*A01K 1/04* (2006.01)
*A01K 27/00* (2006.01)
*A45B 11/00* (2006.01)

(52) U.S. Cl.
CPC .............. *A01K 27/004* (2013.01); *A45B 11/00* (2013.01); *A45B 2200/1009* (2013.01); *B60P 7/0846* (2013.01); *E05B 73/0029* (2013.01)

(58) Field of Classification Search
CPC ........... E01F 13/022; B66D 1/26; A01K 1/04; A01K 27/004; B65H 75/48; E05B 73/0011; E05B 73/0029
USPC ........................................ 248/519; 24/68 CD
See application file for complete search history.

(56) References Cited

U.S. PATENT DOCUMENTS

| | | | |
|---|---|---|---|
| 2,449,600 A * | 9/1948 | Geiger | B60P 7/083 410/100 |
| 3,752,407 A * | 8/1973 | Baugh | F21S 4/10 362/123 |
| 3,827,650 A * | 8/1974 | Stevens | B65H 75/4471 242/379.2 |
| 4,543,806 A * | 10/1985 | Papandrea | E05B 67/006 242/380 |
| 4,887,551 A * | 12/1989 | Musetti | B65H 75/182 119/796 |
| 4,942,943 A * | 7/1990 | Flaherty | A62B 35/04 248/539 |
| 4,970,882 A * | 11/1990 | Arrendondo | B62H 5/003 242/379.2 |
| 5,004,177 A * | 4/1991 | Somers | B66D 5/32 242/395 |
| 5,217,208 A * | 6/1993 | Stephenson | F16G 11/12 242/379 |
| 5,251,464 A * | 10/1993 | Halter | B62J 11/00 242/379.2 |
| 5,354,031 A | 10/1994 | Bilotti | |
| D378,048 S * | 2/1997 | Seigel | D8/354 |
| 5,722,266 A * | 3/1998 | Yeager | E05B 73/0029 242/421 |
| 5,941,261 A | 8/1999 | Kouvaras | |
| 5,960,652 A * | 10/1999 | Marmstad | E05B 73/0011 70/30 |
| 6,290,440 B1 * | 9/2001 | DiViccaro | B60P 7/0823 410/101 |
| 6,305,659 B1 | 10/2001 | Metelski | |
| 6,792,893 B1 * | 9/2004 | Quintero | A01K 27/004 119/796 |
| 6,895,982 B1 | 5/2005 | Shaw | |
| 6,957,938 B1 * | 10/2005 | Beasley | B60P 7/0823 410/97 |
| 6,964,277 B2 | 11/2005 | Naber | |
| 7,069,939 B1 | 7/2006 | Conde | |
| 7,104,091 B2 * | 9/2006 | Kuhblank | B62H 5/003 340/432 |
| 7,178,790 B2 * | 2/2007 | de Lorenzo | E01F 13/028 49/34 |
| 7,272,962 B2 * | 9/2007 | Benda | E05B 67/006 70/30 |
| 7,562,930 B1 | 7/2009 | Rondeau | |
| 7,614,600 B1 | 11/2009 | Smith | |
| 7,717,655 B2 * | 5/2010 | Cardona | A61G 3/0808 410/23 |
| 7,762,215 B2 * | 7/2010 | Horton | A01K 27/004 242/379.2 |
| 7,789,459 B1 | 9/2010 | Rodriguez | |
| 7,926,451 B2 * | 4/2011 | Foster | A01K 27/003 119/796 |
| 8,393,302 B1 * | 3/2013 | Blakemore | A01K 27/003 119/796 |
| 8,656,937 B1 | 2/2014 | Minasi | |
| 8,684,390 B1 * | 4/2014 | Barrette | B60D 1/185 242/378.1 |
| 8,919,722 B2 | 12/2014 | Ma | |
| 8,955,465 B1 * | 2/2015 | VanDommelen | A01K 27/003 119/795 |
| 8,973,222 B2 * | 3/2015 | Breeden | B60P 7/0853 242/388.3 |
| 9,127,475 B2 | 9/2015 | LeAnna | |
| 9,706,820 B1 | 7/2017 | Lopez | |
| D817,631 S | 5/2018 | Weng | |
| 9,974,369 B1 | 5/2018 | DePaolo | |
| 10,017,955 B2 | 7/2018 | Ye | |
| 10,327,418 B2 | 6/2019 | Johnson | |
| 10,485,222 B2 * | 11/2019 | Skinner | A01K 27/004 |
| 10,492,579 B1 | 12/2019 | Volin | |
| 10,609,994 B2 | 4/2020 | Vanderminden | |
| 10,653,218 B1 | 5/2020 | Volin | |
| 10,844,638 B2 * | 11/2020 | Sud | E05B 15/08 |
| 11,485,605 B2 * | 11/2022 | Sury | B65H 75/4431 |
| 12,053,081 B2 * | 8/2024 | Smith | A45F 3/44 |
| 2001/0046425 A1 * | 11/2001 | Vagnino | B60R 7/10 410/101 |
| 2002/0036008 A1 | 3/2002 | Hickam | |
| 2002/0108645 A1 | 8/2002 | Beyer | |
| 2004/0056169 A1 | 3/2004 | Harbaugh | |
| 2004/0084558 A1 * | 5/2004 | Huang | B65H 54/585 242/385.4 |
| 2005/0199774 A1 | 9/2005 | Reese | |
| 2007/0181079 A1 * | 8/2007 | Fong | A01K 1/04 119/786 |
| 2007/0215064 A1 * | 9/2007 | Petersen | A01K 1/04 119/786 |
| 2010/0175233 A1 * | 7/2010 | Breeden | B60P 7/0846 24/68 CD |
| 2011/0067649 A1 * | 3/2011 | O'Brien | A01K 27/004 119/796 |
| 2011/0079700 A1 | 4/2011 | Hilderbrand | |
| 2014/0209132 A1 | 7/2014 | Landry | |
| 2014/0227920 A1 | 8/2014 | Lovett | |
| 2016/0183702 A1 | 6/2016 | Elze | |
| 2016/0309896 A1 | 10/2016 | Jankulovich | |
| 2016/0369521 A1 | 12/2016 | Eldridge | |
| 2018/0370417 A1 * | 12/2018 | Nornes | B60P 7/0846 |
| 2019/0037984 A1 | 2/2019 | Lake | |
| 2019/0107246 A1 | 4/2019 | Lidsay | |
| 2019/0297853 A1 * | 10/2019 | Blakemore | A01K 27/004 |
| 2019/0360229 A1 | 11/2019 | Vanderminden | |
| 2020/0208430 A1 | 7/2020 | LeAnna | |
| 2020/0231083 A1 * | 7/2020 | Shrewsbury | B65H 54/585 |
| 2020/0231376 A1 * | 7/2020 | Alexander | B60P 7/0846 |
| 2020/0256080 A1 | 8/2020 | North | |
| 2022/0104614 A1 * | 4/2022 | Schneiderman | E04H 12/2246 |
| 2022/0268049 A1 | 8/2022 | Frerich | |
| 2022/0272940 A1 * | 9/2022 | Chefetz | A01K 27/004 |
| 2023/0036000 A1 | 2/2023 | Shaffer | |
| 2024/0067076 A1 * | 2/2024 | Montgomery | B60P 7/0846 |
| 2024/0108108 A1 * | 4/2024 | Francis | A45B 17/00 |

FOREIGN PATENT DOCUMENTS

| | | | |
|---|---|---|---|
| WO | 2004/101915 | 11/2004 | |
| WO | 2005/065279 | 7/2005 | |
| WO | 2006/090295 | 8/2006 | |
| WO | 2015/013342 | 1/2015 | |
| WO | WO-2024182904 A1 * | 9/2024 | ......... E05B 73/0029 |

* cited by examiner

RETENTION PATIO LEASH FOR PATIO FURNITURE

CROSS-REFERENCE TO RELATED APPLICATIONS

This application claims priority to and the benefit of U.S. Provisional Patent Application No. 63/441,889, filed Jan. 30, 2023. This application is also a continuation-in-part of U.S. patent application Ser. No. 17/814,669, filed Jul. 25, 2022, now U.S. Pat. No. 11,946,271, which claims priority to and the benefit of U.S. Provisional Patent Application No. 63/203,556, filed Jul. 27, 2021. All of the above applications are hereby incorporated by reference in their entireties.

INTRODUCTION

Patio or outdoor furniture generally is exposed to moisture and harsh weather including wind. During windy conditions, it is desirable that the outdoor furniture be restricted or prevented from being moved or blown away by the wind. Some outdoor furniture is constructed from lightweight, but durable materials, such as aluminum, so that they are easy to move around and can withstand wear and tear. However, this type of outdoor furniture can be prone to being moved or blown away in windy conditions. Accordingly, improvements to patio or outdoor furniture are desired.

SUMMARY

In an aspect, the technology relates to a retention patio leash for outdoor furniture including: a housing having a first end and an opposite second end defining a longitudinal axis, the housing including: a first collar disposed at the first end; a second collar disposed at the second end, the first and second collars defining a through opening configured to receive at least a portion of the outdoor furniture; and an intermediate disc body disposed between the first collar and the second collar, the intermediate disc body defining an internal cavity and a plurality of slots defined on a sidewall; and a retention system supported within the intermediate disc body, the retention system including: one or more retractable straps mounted to the housing at a respective slot of the plurality of slots on the sidewall; and a fastener coupled to a free end of each of the one or more retractable straps and configured to releasably attach to other outdoor furniture, wherein the fastener is adapted to selectively extend outwards from the housing via the one or more retractable straps.

In an example, the through opening of the housing is configured to releasably couple to an umbrella pole. In another example, the housing includes a first body coupled to a second body, the first body being identical to the second body. In yet another example, the first body and the second body include interior posts disposed within the internal cavity, the interior posts coupled together forming the housing. In still another example, the housing is not weighted. In an example, each of the one or more retractable straps has a case that is disposed within the internal cavity. In another example, the intermediate disc body has an inner surface defining a plurality of channels configured to receive at least a portion of the case.

In another aspect, the technology relates to a retention patio leash for outdoor furniture includes: a first body having a first disc with a first collar extending from one side and a first flange extending from an opposite side, a plurality of first recesses defined in the first flange; a second body having a second disc with a second collar extending from one side and a second flange extending from an opposite side, a plurality of second recessed defined in the second flange, wherein the first body is coupled to the second body such that an interior cavity is formed by the first and second discs and the first and second flanges with the first and second recesses forming a plurality of circumferentially spaced slots; and a retention system supported within the interior cavity, the retention system including: a plurality of retractable straps extending though a respective slot of the plurality of circumferentially spaced slots; a fastener coupled to one end of each of the plurality of retractable straps, the fastener configured to releasable attach to the outdoor furniture; and a case coupled to an opposite end of each of the plurality of retractable straps, the case disposed within the interior cavity and secured to one or both of the first and second discs.

In an example, the first and second collars define a through opening, the through opening separated from the interior cavity. In another example, the through opening is sized and shaped to receive an umbrella pole. In yet another example, the first collar is axially longer than the first flange and the second collar is axially longer than the second flange. In still another example, the first body is identical to the second body. In an example, the first body includes at least one first post extending from the side of the first disc that the first flange extends from and the second body includes at least one second post extending from the side of the second disc that the second flange extends from, the at least one first post configured to couple to the at least one second post for securing the first body to the second body. In another example, the first and second discs include a plurality of channels configured to at least partially receive the case of the retention system.

In another aspect, the technology relates to a retention patio leash for outdoor furniture including: a housing defined by a first body and a second body, the housing including: a first collar and a second collar defining a longitudinal axis and a through opening in the housing; a first disc extending from the first collar and a second disc extending from the second collar, the first disc spaced apart from the second disc along the longitudinal axis; and a sidewall extending between the first disc and the second disc, the sidewall defining a plurality of slots, wherein the housing defines an interior cavity separated from the through opening; and a retention system supported within the interior cavity, the retention system including: a plurality of retractable straps extending though a respective slot of the plurality of slots; a fastener coupled to one end of each of the plurality of retractable straps, the fastener configured to releasable attach to the outdoor furniture; and a case coupled to an opposite end of each of the plurality of retractable straps, the case disposed within the interior cavity and secured to one or both of the first and second discs.

In an example, an outer diameter of the sidewall is larger than an outer diameter of the first and second collars. In another example, the first body is snap fit or press fit coupled to the second body. In yet another example, the first body includes at least one first interior snap-fit post and the second body includes at least one second interior snap-fit post. In still another example, a retention screw is supported on the first collar or the second collar. In an example, the first body and the second body are injection molded plastic components.

BRIEF DESCRIPTION OF THE DRAWINGS

The following drawing figures, which form a part of this application, are illustrative of described technology and are not mean to limit the scope of the invention as claimed in any manner, which scope shall be based on the claims appended hereto.

FIG. 18 is an interior view and FIG. 18A is a cross-sectional view taken along line 18A-18A of one of the housing bodies.

DETAILED DESCRIPTION

Various features as well as advantages that characterize the umbrella base and the retention patio leash described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings. It is to be understood that both the foregoing introduction and the following detailed description are exemplary and explanatory and are intended to provide further explanation of the invention as claimed.

Throughout this description, references to orientation (e.g., front(ward), rear(ward), top, bottom, back, right, left, upper, lower, etc.) of the umbrella base and the retention patio leash relate to the position when placed on an underlying surface and/or in use on an umbrella are used for ease of description and illustration only. No restriction is intended by use of the terms regardless of how the umbrella base and the retention patio leash are situated on their own.

The umbrella base described herein is used to support an umbrella (e.g., a patio umbrella) in its upright orientation and for typical outdoor use. Generally, the outdoor umbrella is accompanied with outdoor furniture that can undesirably blow away in the wind when not in use. As such, once the outdoor furniture is no longer in use and to reduce or prevent the furniture from blowing away in the wind, the umbrella base includes a plurality of fastener devices that can be extended from the umbrella base and attached to the adjacent outdoor furniture. By attaching the outdoor furniture to the umbrella base, the outdoor furniture is weighed down against the wind. The fastener devices can be used regardless of the umbrella being supported by the umbrella base. By utilizing the umbrella base as a hold down device, additional components of an outdoor furniture set are no longer needed and do not need to be separately stored when no longer in use. Additionally, the umbrella base can be moved and repositioned as required or desired.

Figure 1:
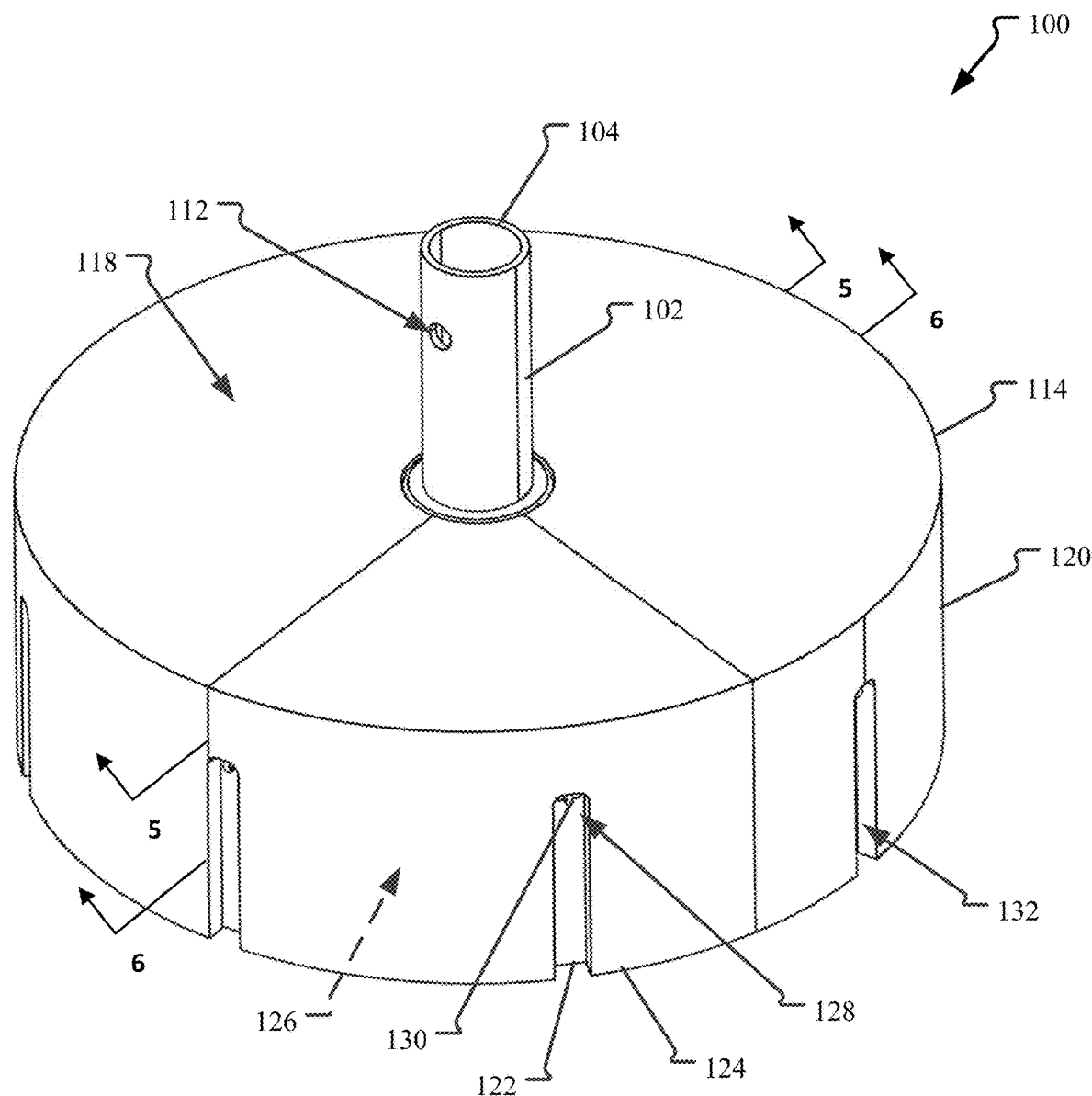
FIG. 1 is a top perspective view of an exemplary umbrella base.
Figure 2:
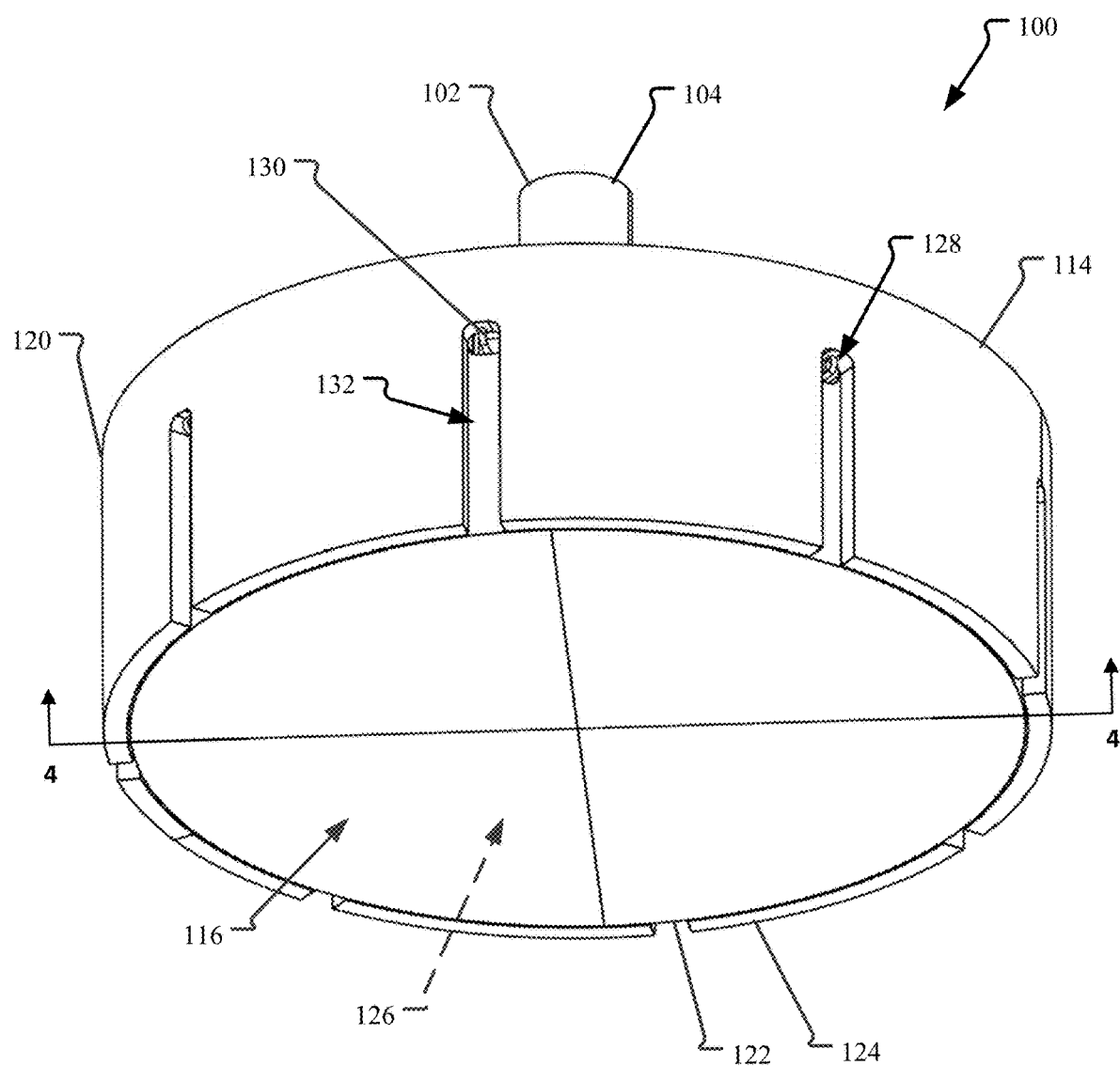
FIG. 2 is a bottom perspective view of the umbrella base.

FIG. 1 is a top perspective view of an exemplary umbrella base 100. FIG. 2 is a bottom perspective view of the umbrella base 100. Referring concurrently to FIGS. 1-2, the umbrella base 100 includes an elongated receiver 102 configured to at least partially receive an end of a pole of an umbrella (e.g., umbrella 202 shown in FIG. 9). As such, the umbrella is configured to cantilever from the umbrella base 100 such that a canopy of the umbrella is supported in the air without tipping over and users can be at least partially underneath. The elongated receiver 102 has a top end 104 and an opposite bottom end 106 (shown in FIG. 3). In the example, the elongated receiver 102 is formed as a tube that is open at both the top and bottom ends 104, 106. The bottom end 106 may include threads. In an aspect, the elongated receiver 102 may be about 12 inches long and 2 inches in diameter.

A securement device 108 (shown in FIG. 9) is disposed proximate the top end 104 and is utilized to secure the umbrella pole at least partially within the elongated receiver 102. In an aspect, the securement device 108 includes a threaded bolt and a knob 110 that are mounted at an aperture 112 defined within the elongated receiver 102. The knob 110 can be rotated so as to move the bolt within the aperture 112 and engage with the umbrella pole to secure the pole to the elongated receiver 102 and hold the umbrella upright.

Additionally, the umbrella base 100 includes a housing 114 coupled to and at least partially surrounding the elongated receiver 102. The housing 114 enables the umbrella to be supported in a substantially upright position without tipping over. For example, the housing 114 is weighted so as to support the umbrella. In operation, the umbrella can be inserted at least partially into the umbrella base 100 so that the umbrella is supported and the canopy can be used to cover and/or shade an area as required or desired. Typically, during windy conditions, the canopy of the umbrella is collapsed and/or the umbrella completely removed from the umbrella base 100 so that the umbrella is not moved by the wind. The umbrella base 100 may be weighted and has a low profile that is wind resistant so that the umbrella base 100 can be left out in windy conditions.

In the example, the housing 114 has a substantially cylindrical shape with a bottom surface 116, a top surface 118, and a side wall 120 extending between the top and bottom surfaces 116, 118. The bottom surface 116 is configured to be placed directly on an underlying surface such as a deck, patio, or the like so that the umbrella can be supported thereon. The top end 104 of the elongated receiver 102 extends upward from the top surface 118, and in an aspect, the elongated receiver 102 is centered within the housing 114. The housing 114 is enlarged relative to the elongated receiver 102 so as to restrict or prevent the umbrella from tipping over when supported by the umbrella base 100. In an aspect, the exterior dimensions of the housing 114 may have the side wall 120 being about 6 inches tall with about a 20 inch outer diameter.

The housing 114 includes a bottom body 122 that defines the bottom surface 116 and a top body 124 that defines the top surface 118 and the side wall 120. In the example, the bottom body 122 is configured to be received at least partially within the top body 124. The bottom body 122 and the top body 124 define an interior cavity 126.

In the example, the housing 114 is configured to be weighted so as to support the umbrella in a cantilever-type position. In an aspect, the interior cavity 126 of the housing 114 is configured to receive one or more weights to provide mass to the housing 114. For example, the interior cavity 126 can be filled with water, sand, and/or weighted plates in order to provide mass to the housing 114. In this example, the water, sand, and/or plates can be removed to make it easier to move and reposition the umbrella base 100. In another aspect, the housing 114 (e.g., the bottom and top bodies 122, 124) may be formed from a dense material (e.g., cast iron or the like) in order to add mass to the housing 114.

It should be appreciated, that FIGS. 1-2 show only one possible example of an umbrella base 100, and the umbrella base 100 can take on a variety of shapes and sizes while still enabling the umbrella base 100 to function as described herein. For example, the umbrella base 100 can include wheels (not shown) so that it is easier to move and position the housing 114. In another example, the umbrella base 100 can include one or more handles (not shown). In still another example, the umbrella base 100 can take the shape of an end table. In yet another example, the elongated receiver 102 may be off-center relative to the housing 114 so that the umbrella can be supported and placed against a wall or a railing as required or desired. In other examples, the housing 114 can be square-shaped, dome-shaped, cross-shaped, or the like.

The umbrella base 100 also includes a retention system 128 supported by the housing 114. In the example, the retention system 128 is disposed within the interior cavity 126. The retention system 128 includes one or more fastener devices 130 that are configured to selectively extend outward from the housing 114 and releasably attach to outdoor furniture. The fastener device 130 is any type of connection member that can releasably attach to outdoor furniture. As illustrated, the fastener device 130 includes a hook. In other examples, the fastener device can include a snap hook, an adjustable strap like a hook and loop fastener, an elastic member, or the like. The fastener device 130 is configured to attach to a portion of the outdoor furniture such as a leg of a table or chair, an arm rest of a chair, a frame of a table, or any other component of the outdoor furniture as required or desired. By coupling the housing 114 to the outdoor furniture, the outdoor furniture is weighed down by the housing 114, via the retention system 128, so that wind and other environmental conditions are restricted or prevented from moving and blowing away the outdoor furniture.

In the example, the retention system 128 includes a plurality of fastener devices 130 spaced circumferentially around the side wall 120. This configuration enables multiple pieces of outdoor furniture to be attached to the umbrella base 100. For example, multiple chairs, multiple tables, or both chairs and tables may be attached to the umbrella base 100 and weighed down to protect against windy conditions. In other examples, the umbrella base 100 may be disposed under a table with a portion of the umbrella pole extending from the elongated receiver 102 and through the table itself. As such, the retention system 128 can be used to attach to one or more chairs and/or the table so as to weigh down the outdoor furniture. One example of this configuration is described further below and in reference to FIG. 9.

The retention system 128 is disposed at least partially within the housing 114 so as to reduce the amount of components that project from the housing 114. In the example, a plurality of slots 132 are defined in the side wall 120 of the housing 114 that the fastener device 130 can extend through and project out from the housing 114. As such, the fastener devices 130 are positioned proximate the exterior of the side wall 120. The slots 132 can extend from the bottom surface 116 towards the top surface 118 on the side wall 120. The top end of the slots 132 terminate prior to the top surface 118 while extending all the way through the bottom surface 116. In other examples, the slots 132 can be fully defined by the side wall 120 and between the top and bottom surfaces 118, 116 as required or desired. In examples, not all slots 132 may receive a portion of the retention system 128.

The retention system 128 is disposed proximate the top surface 118 and offset from the underlying surface when the housing 114 is placed thereon. This location can maintain the operational functionality and the ornamental look of the housing 114 for supporting an umbrella. Additionally, by locating the fastener devices 130 above the underlying surface and towards the top surface 118, the fastener devices 130 can attach to the outdoor furniture at a position raised from the underlying surface so as to reduce or prevent the furniture from tipping over during a windy conditions. In other examples, the fastener devices 130 can extend from the top surface 118 as required or desired.

Figure 3:
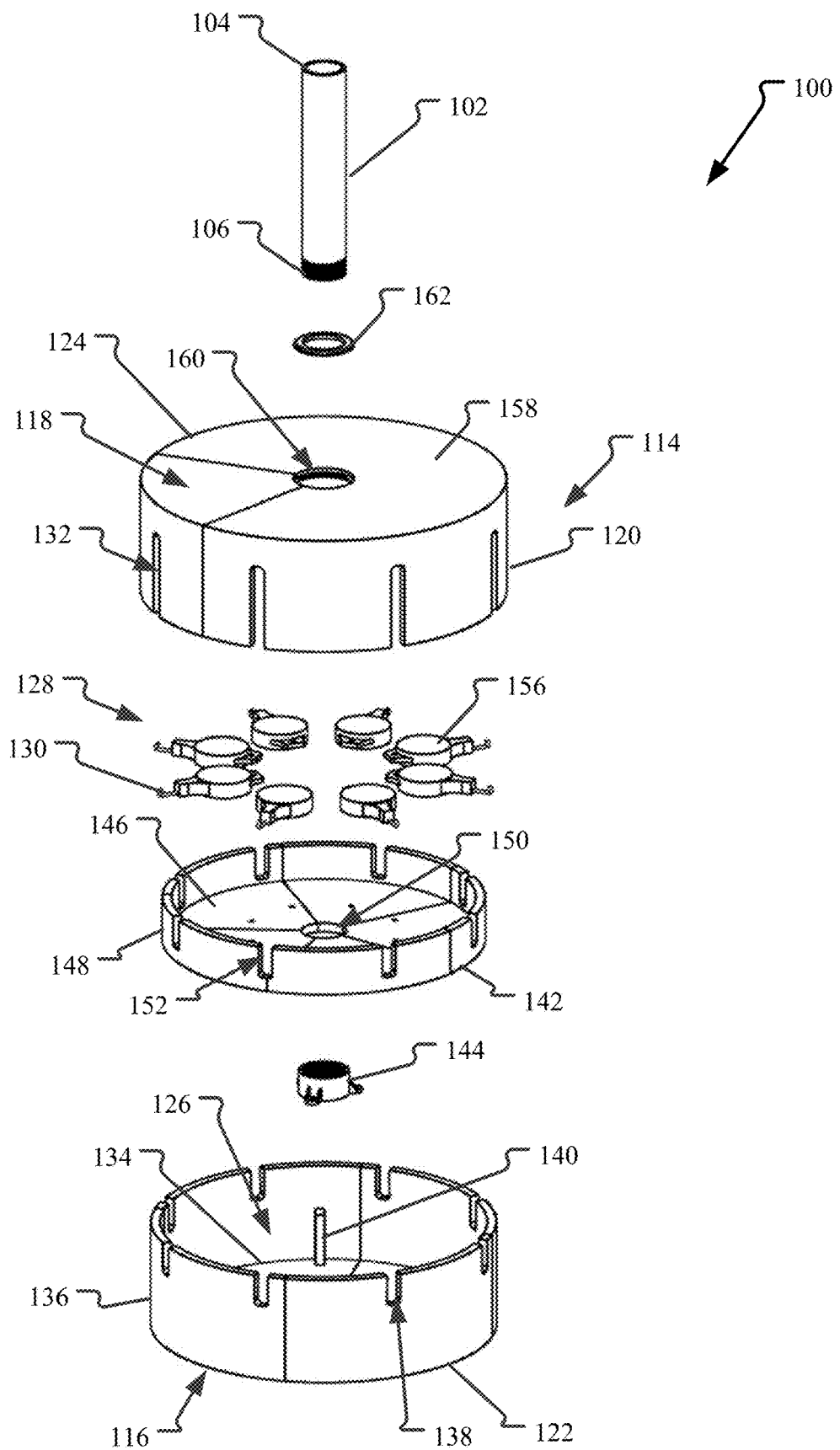
FIG. 3 is an exploded perspective view of the umbrella base.

FIG. 3 is an exploded perspective view of the umbrella base 100. The bottom body 122 has a bottom wall 134 that forms the bottom surface 116 of the housing 114 and a bottom side wall 136. At the top end of the bottom side wall 136, a plurality of slots 138 are defined and that enable the retention system 128 to be disposed within the housing 114 and allow the fastener devices 130 to extend and retract therefrom. One or more interior struts 140 are positioned within the bottom body 122 and against the bottom side wall 136. The interior struts 140 are configured to support an inner body 142 of the housing 114 within the bottom body 122.

A collar 144 is coupled to the bottom wall 134 and is threaded so that the bottom end 106 of the elongated receiver 102 is coupled to the bottom body 122 and extends upward therefrom.

The inner body 142 is configured to be receive at least partially within the interior cavity 126 defined within the bottom and top bodies 122, 124. The inner body 142 has an inner bottom wall 146 and an inner side wall 148. The inner bottom wall 146 defines an opening 150 for the elongated receiver 102 to extend through. At the top end of the inner side wall 148, a plurality of slots 152 are defined and that enable the retention system 128 to be disposed within the housing 114 and allow the fastener devices 130 to extend and retract therefrom. The inner bottom wall 146 is configured to support the retention system 128 in the interior cavity 126.

The retention system 128 is coupled to the inner body 142 which allows for the retention system 128 to be easily assembled and positioned within the housing 114. The retention system 128 include a plurality of retractable straps 154 (shown in FIG. 7) with each of the retractable straps 154 having the fastener device 130 coupled to a free end. The retractable straps 154 are housed within a case 156 that secures to the inner body 142 (e.g., via fasteners—not shown). The retractable straps 154 enable the fastener devices 130 to be positioned at least partially exterior of the side wall 120 of the top body 124 and selectively and retractably extend outwards so as to releasably attach to outdoor furniture. The retractable straps 154 also enable the fastener device 130 to be automatically retracted towards the housing 114 upon release from the outdoor furniture.

The top body 124 includes the side wall 120 which extends from a top wall 158 that forms the top surface 118 of the housing 114. The slots 132 extend upward from the bottom end of the side wall 120. An opening 160 is defined within the top wall 158 so that the top end 104 of the elongated receiver 102 can extend from the top surface 118. A gasket 162 can be used between the top body 124 and the elongated receiver 102 to provide an environmental seal at the top surface 118 and protect the retention system 128 below.

Figure 4:
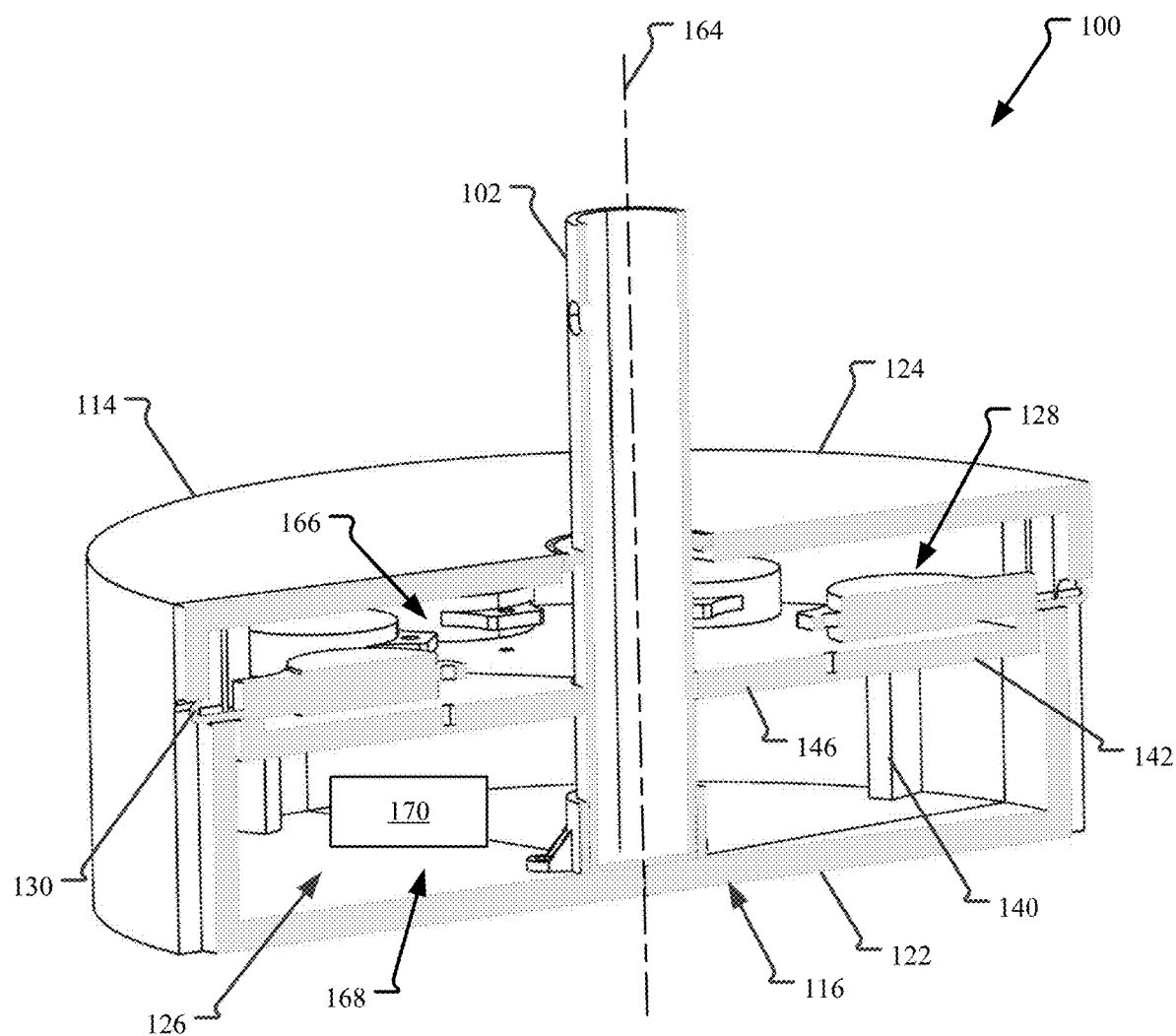
FIG. 4 is a cross-sectional perspective view of the umbrella base taken along line 4-4 shown in FIG. 2.
Figure 5:
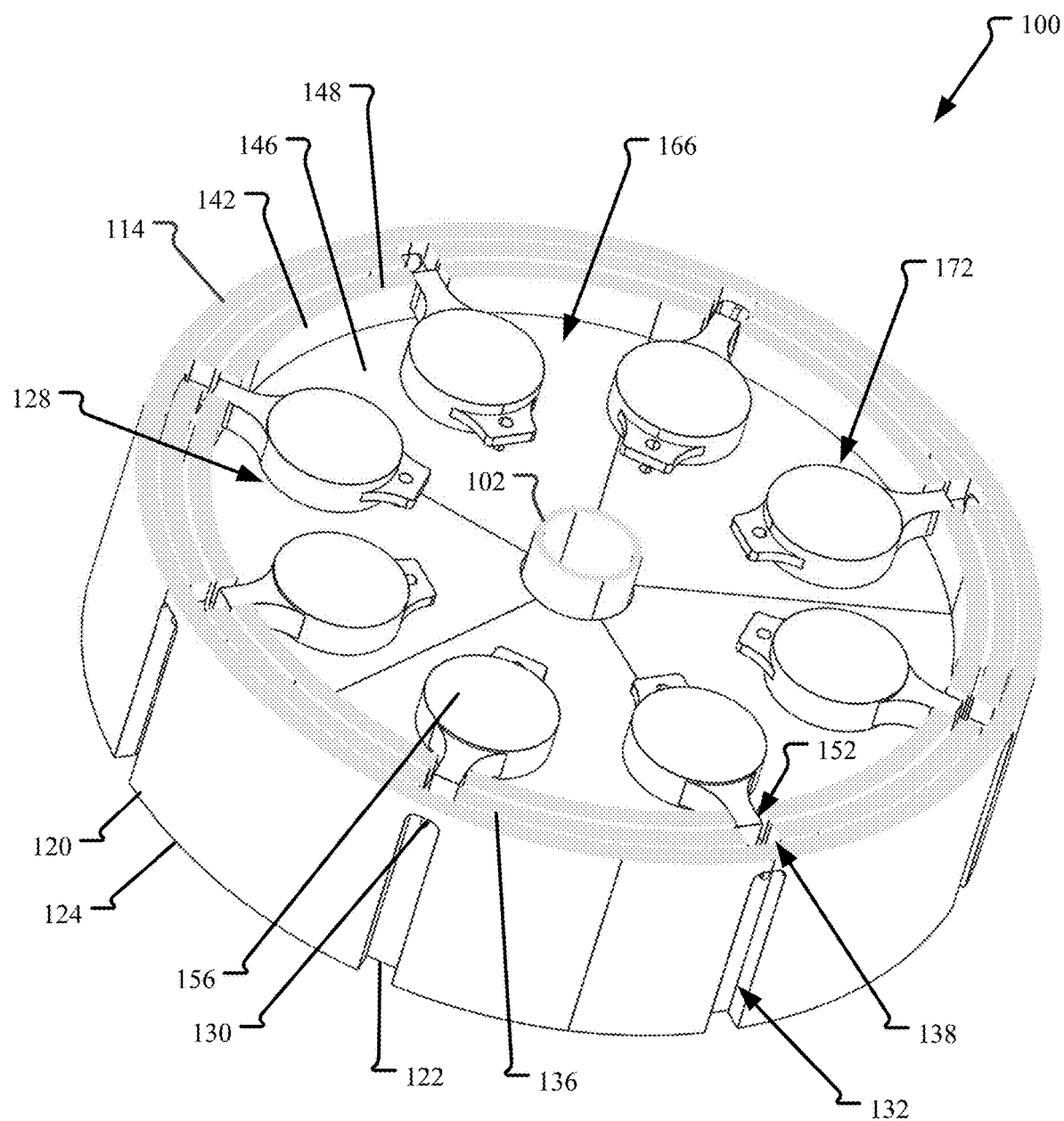
FIG. 5 is another cross-sectional perspective view of the umbrella base taken along line 5-5 shown in FIG. 1.
Figure 6:
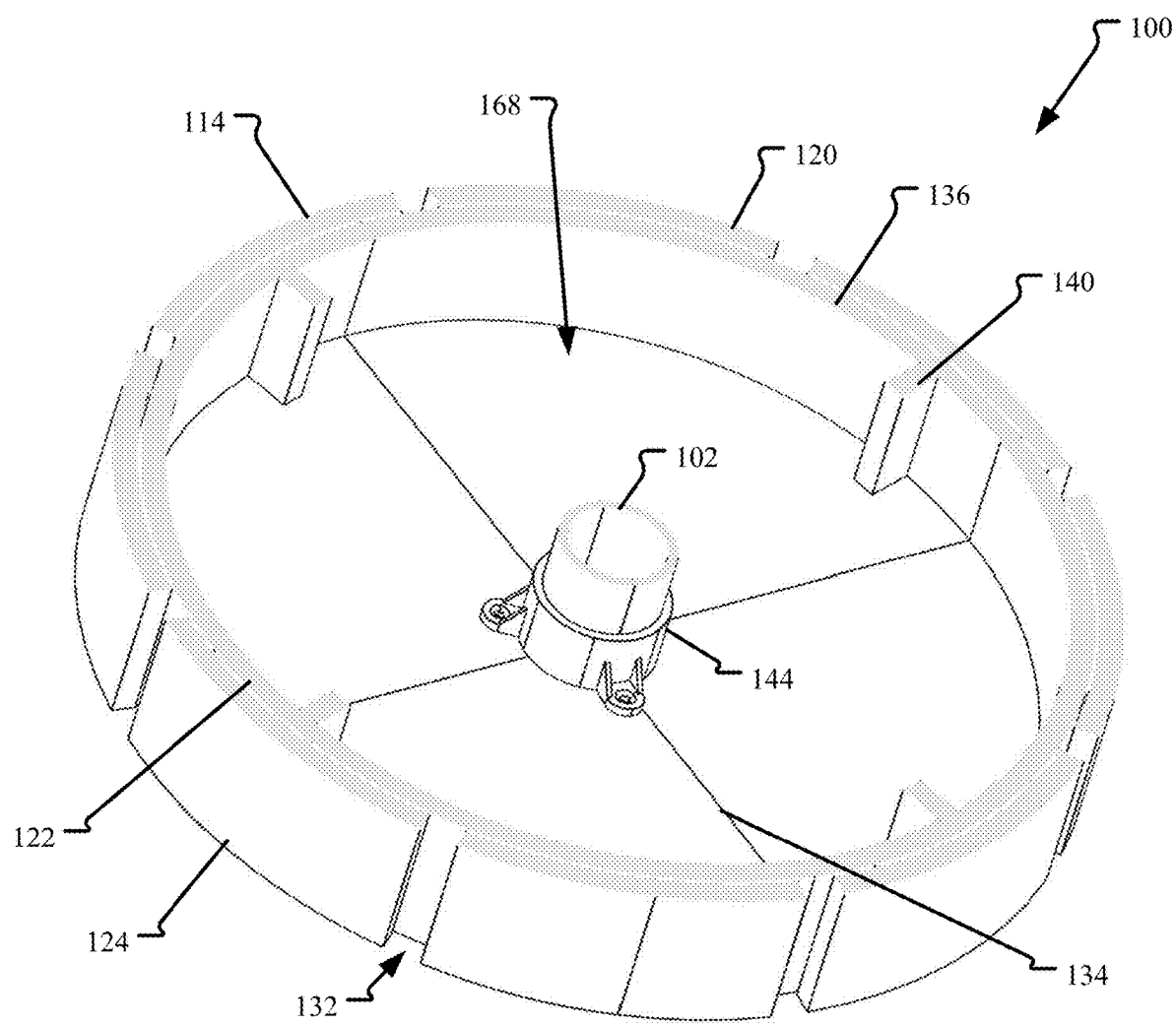
FIG. 6 is another cross-sectional perspective view of the umbrella base taken along line 6-6 shown in FIG. 1.

FIG. 4 is a cross-sectional perspective view of the umbrella base 100 taken along line 4-4 shown in FIG. 2. FIG. 5 is another cross-sectional perspective view of the umbrella base 100 taken along line 5-5 shown in FIG. 1. FIG. 6 is another cross-sectional perspective view of the umbrella base 100 taken along line 6-6 shown in FIG. 1. Starting first with FIG. 4, the housing 114 is formed from multiple components with the bottom body 122, the top body 124, and the inner body 142. The bottom and top bodies 122, 124 define the interior cavity 126. The elongated receiver 102 is supported by the housing 114 and defines a longitudinal axis 164 that extends in a substantially vertical direction when the umbrella base 100 is positioned on the underlying surface.

The inner body 142 is disposed within the interior cavity 126 such that the inner bottom wall 146 of the inner body 142 is raised above the bottom surface 116 of the housing 114. In the example, the inner body 142 is supported within the bottom body 122 with the interior struts 140. As such, the height of the interior struts 140 along the longitudinal axis 164 defines the position of the inner body 142 within the interior cavity 126. In an example, the height of the interior struts 140 is about 3 inches. The retention system 128 is mounted at least partially within the interior cavity 126 via the inner body 142. The inner body 142 divides the interior cavity 126 of the housing 114 into a top cavity 166 and a bottom cavity 168 relative to the longitudinal axis 164. The retention system 128 is disposed within the top cavity 166, and one or more weights 170 (illustrated schematically) are disposed within the bottom cavity 168. In the example, the top cavity 166 and the bottom cavity 168 are discrete from each other so as to separate the retention system 128 and the weights 170. The weights 170 may include sand, water, weighted plates, or the like.

In the example, the top cavity 166 has a smaller volume than bottom cavity 168 so that the umbrella base 100 can accommodate enough weight to weigh it down. In an aspect, the top cavity 166 is about ⅔ the volume of the bottom cavity 168. By positioning the retention system 128 above the bottom surface 116, the fastener devices 130 may be more easy to handle and allows for the connection to the outdoor furniture to occur higher up the leg/structure to reduce overturning moment from wind loads. In the example, the fastener devices 130 are positioned about 4⅜ inches above the bottom surface 116.

Turning next to FIG. 5, the top cavity 166 is illustrated. In the example, the top cavity 166 is disposed in the top half of the interior cavity 126 (shown in FIG. 4). As such, the retention system 128 disposed in the top half of the housing 114. The retention system 128 includes a plurality of discrete retention devices 172. Each retention device 172 includes the case 156 that is mounted to the inner bottom wall 146 of the inner body 142. The case 156 houses the retractable straps 154 (shown in FIG. 7) with the fastener device 130 coupled to the free end. The fastener device 130 is accessible from the exterior of the housing 114 even with the majority of the retention system 128 be positioned within the housing 114. The retractable strap 154 can be selectively pulled out from the housing 114 so that the fastener device 130 can extend and retract relative to the side wall 120 of the top body 124. In the example, the retractable strap 154 extends through the slot 132 defined in the side wall 120 of the top body 124, the slot 152 defined in the inner side wall 148 of the inner body 142, and the slot 138 defined in the bottom side wall 136 of the bottom body 122. As such, the fastener device 130 is positioned exterior of the top cavity 166 and the case 156 is positioned within the top cavity 166.

The retention devices 172 of the retention system 128 are circumferentially spaced around the longitudinal axis 164 (shown in FIG. 4) so that the retractable straps 154 radially extend and retract relative to the longitudinal axis 164. As illustrated, there are eight retention devices 172, however, any other number of retention devices 172 can be included as required or desired. Additionally, each retention device 172 is discrete and independent from each other. As such, each fastener device 130 can be independently used as required or desired. In other example, the retention devices 172 may be coupled together within the retention system 128 so that movement of opposing fastener devices 130 correspond to one another. In this example, the retention devices 172 may be integral with one another.

The retention system 128 includes a plurality of retractable straps 154 and the straps are discrete from one another. By using individual retractable straps 154, the retention system 128 can be modified as required or desired to the type and configuration of outdoor furniture that is to be attached. As illustrated, the retractable straps 154 are circumferentially spaced around the elongated receiver 102 and approximately 45° apart. This configuration can be used to attach to a plurality of different chairs that are around a table, with the umbrella base 100 below and in the middle of the table. In order to increase or decrease the number of outdoor furniture pieces that can be attached, the retractable straps 154 can be added or removed as required or desired. In the example, a total of eight retractable straps 154 are provided. Other numbers and spacings are also contemplated herein, for example, four retention device 172 and retractable straps 154 spaced 90° relative to each other. In an aspect, if fewer retention devices 172 are provided, the housing 114 may still include a greater number of slots 132, 138, 152 for modification later as required or desired.

The case 156 of the retention device 172 can include a reel that the retractable strap 154 is wound about and that enables the fastener device 130 to automatically retract towards the housing 114 upon release from the outdoor furniture. The case 156 can be attached to the inner bottom wall 146 of the inner body 142 via one or more fasteners (e.g., screws—not shown). In some examples, the reel can generate a retraction force on the retractable strap 154 such that tension is always applied on the strap when extended, and thus, tension is applied to the outdoor furniture when coupled thereto to assist in holding down the furniture in windy conditions. As such, when the fastener device 130 is released in an extended position, the retractable strap 154 automatically retracts into the case 156. In other examples, the reel can include a ratcheting mechanism so that the retractable strap 154 can be extended and have its extended length maintained. Once the retractable strap 154 is released from the ratcheting mechanism (e.g., via a pulling motion), the strap can automatically retract. It should be appreciated, that any other reel mechanism for the retractable strap 154 can be used as required or desired. By having the retention system 128 disposed within the top cavity 166, the umbrella base 100 can be used to retain outdoor furniture, and also store the retention system 128 out of the way when the umbrella is in use.

The bottom body 122, the top body 124, and the inner body 142 are oriented relative to the longitudinal axis 164 such that all of the slots 132, 138, and 152 align with each other and so that the retractable strap 154 can extend out of the housing 114. The slots in the bottom body 122 and the inner body 142 extend from the top of the side walls, while the slots in the top body 124 extend from the bottom of the side wall. This configuration enables for the retention system 128 to be accessible, but the top body 124 still covers the bottom cavity 168 (shown in FIG. 4).

The elongated receiver 102 extends through the inner bottom wall 146 of the inner body 142 such that the elongated receiver 102 extends through the top cavity 166 into the bottom cavity 168. In the example, the retention system 128 is spaced apart from the elongated receiver 102. In other examples, the retention system 128 can be additionally or alternatively coupled to the elongated receiver 102 as required or desired.

Turning next to FIG. 6, the bottom cavity 168 is illustrated. In the example, the bottom body 122 is positioned relative to the top body 124 so that the bottom cavity 168 is formed within the housing 114 to hold at least one weight. The weight can be water, sand, or the like. The weight may also be solid weight plates or the like. In an aspect, the mass of the weight can be adjustable so that more weight can be used when more outdoor furniture is connected to the umbrella base 100. The bottom cavity 168 is substantially devoid of structure so that the weight can be disposed therein. In examples, the water or sand may be held in bladders or tanks that are positioned within the bottom cavity 168. One or more retainers (not shown) may be provided within the bottom cavity 168 that hold retain the weight components when disposed therein.

The interior struts 140 are disposed along the perimeter of the bottom side wall 136 so as to reduce interference with the weights. The interior struts 140 may be circumferentially spaced around the elongated receiver 102. The elongated receiver 102 extends through the housing 114 and couples to the collar 144 mounted to the bottom wall 134 of the bottom body 122. By extending the elongated receiver 102 to the bottom wall 134, cantilevered support for the umbrella pole is increased. At the bottom cavity 168, the bottom side wall 136 of the bottom body 122 covers the slots 132 of the side wall 120 of the top body 124 so as to enclose the bottom cavity 168.

Figure 7:
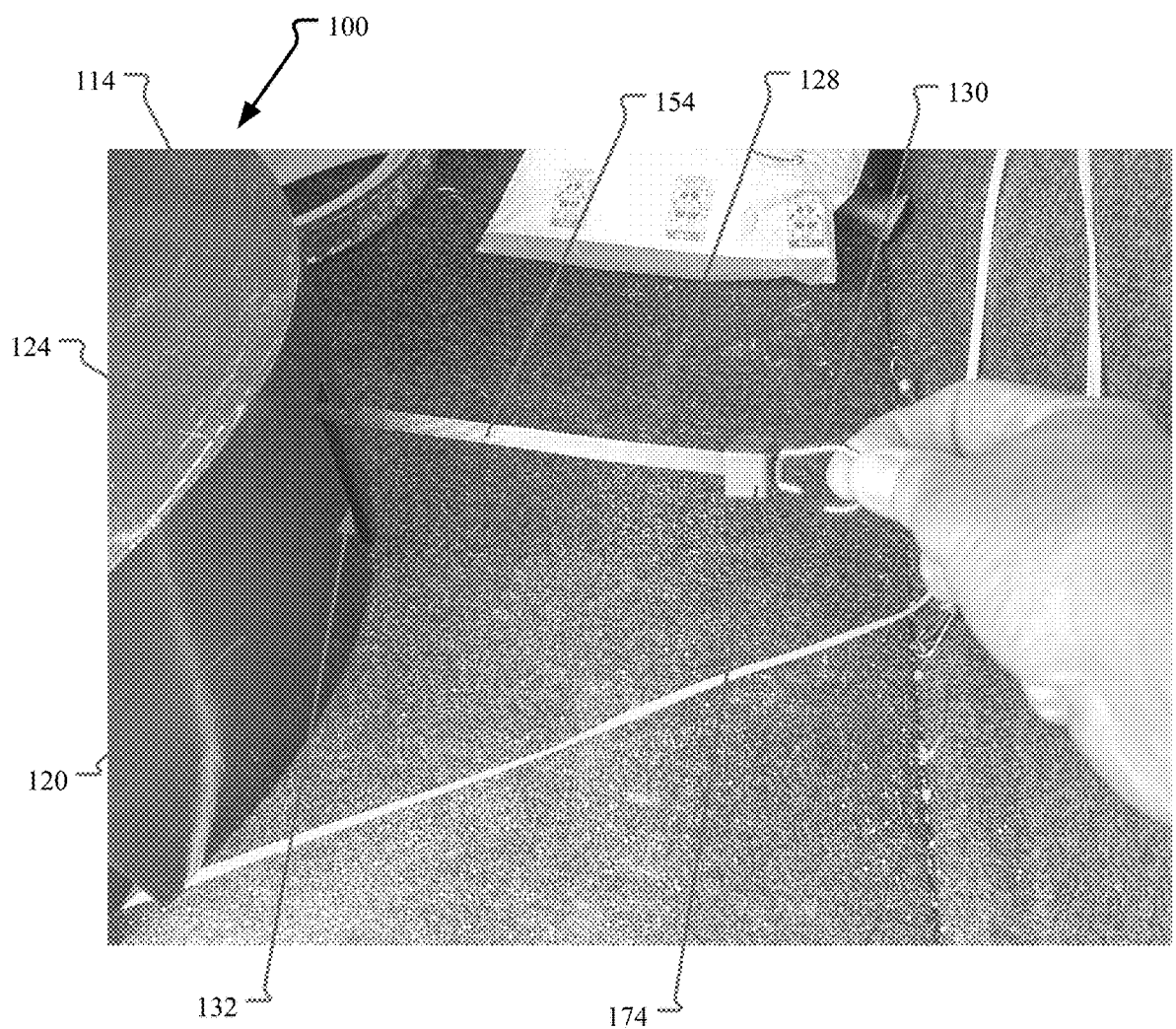
FIG. 7 is a partial perspective view of the umbrella base in an extended configuration.
Figure 8:
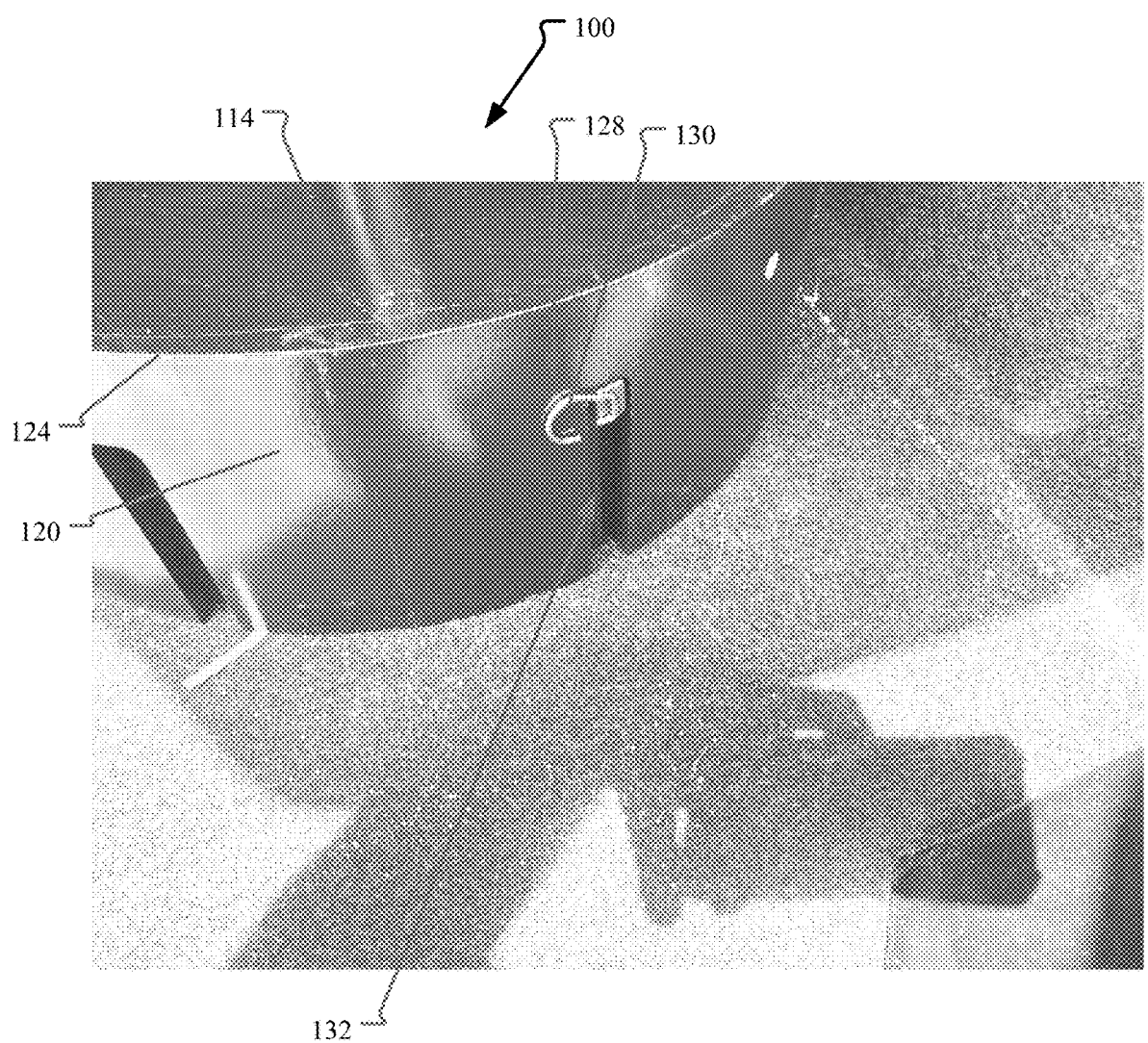
FIG. 8 is a partial perspective view of the umbrella base in a retracted configuration.

FIG. 7 is a partial perspective view of the umbrella base 100 in an extended configuration. FIG. 8 is a partial perspective view of the umbrella base 100 in a retracted configuration. Starting first with FIG. 7, the retention system 128 is illustrated in an extended configuration. That is, the retractable strap 154 is in an extended configuration with the fastener device 130 being disposed apart from the housing 114. In the extended configuration, the fastener device 130 can be attached to the outdoor furniture so that the umbrella base 100 is utilized to hold down the outdoor furniture in windy conditions. The retractable strap 154 extends and retracts from the housing 114 via the slots 132 within the side wall 120 and are flexible so that it is easier to attach the fastener device 130 to a variety of locations on the outdoor furniture. This flexibility of the retractable straps 154 can be in the left or right direction or the up and down direction as required or desired. The extension length of the retractable straps 154 (e.g., a distance that the fastener device 130 is positioned away from the housing 114) is based on the overall length of the strap and the location of the outdoor furniture. In the example, the slots 132 of the top body 124 are aligned with the slots of the bottom body (not shown).

A stop shoulder 174 is disposed at the proximate end of the fastener device 130 and is configured to prevent the fastener device 130 from fully retracting into the housing 114. The stop shoulder 174 is shaped and sized to be received at least partially within the slot 132 and position the fastener device 130 at the side wall 120 of the housing 114 as illustrated in FIG. 8. As such, users can more easily reach the fastener device 130 when attaching it to the outdoor furniture.

Turning to FIG. 8, the umbrella base 100 typically houses the retractable straps 154 (shown in FIG. 7) in a retracted configuration so that the fastener devices 130 are positioned against the side wall 120. In an aspect, one or more recesses may be defined on the side wall 120 by the slots 132 and bottom body configuration to further capture the fastener devices 130. Because the umbrella base 100 also supports an umbrella as required or desired and typically around outdoor furniture (e.g., table and/or chairs). This configuration keeps the fastener devices 130 out of the way so as to reduce people catching their feet on the fastener devices 130 when using the outdoor furniture.

In the retracted configuration, the fastener device 130 may be positioned against the housing 114 and by the slots 132 of the top body 124. In the example, the fastener device 130 is pivotable relative to the free end of each of the straps so that the fastener device 130 can lay substantially flat against the side wall 120. While the retention system 128 is illustrated as being a component of an umbrella base 100, it should be appreciated that the retention system 128 can be used with any other weighted structure so as to retain outdoor furniture. For example, the retention system 128 can be part of an outdoor storage container, an outdoor table, an outdoor cabinet, or the like.

In operation, the housing 114 is used to support the umbrella in its upright orientation. Once the outdoor furniture that surrounds the umbrella base 100 is no longer in use and to reduce or prevent the furniture from blowing away in the wind, the fastener devices 130 can be extended from the umbrella base 100 and attached to the adjacent outdoor furniture. By attaching the outdoor furniture to the umbrella base 100, the outdoor furniture is weighed down against the wind. The fastener devices 130 can be used regardless of the umbrella being supported by the umbrella base 100. By utilizing the umbrella base 100 as a hold down device, additional components of an outdoor furniture set are no longer needed and do not need to be separately stored when no longer in use. For example, dedicated ties downs attached to the underlying surface or a plurality of bungee cords. Additionally, the umbrella base 100 can be moved and repositioned as required or desired.

Figure 9:
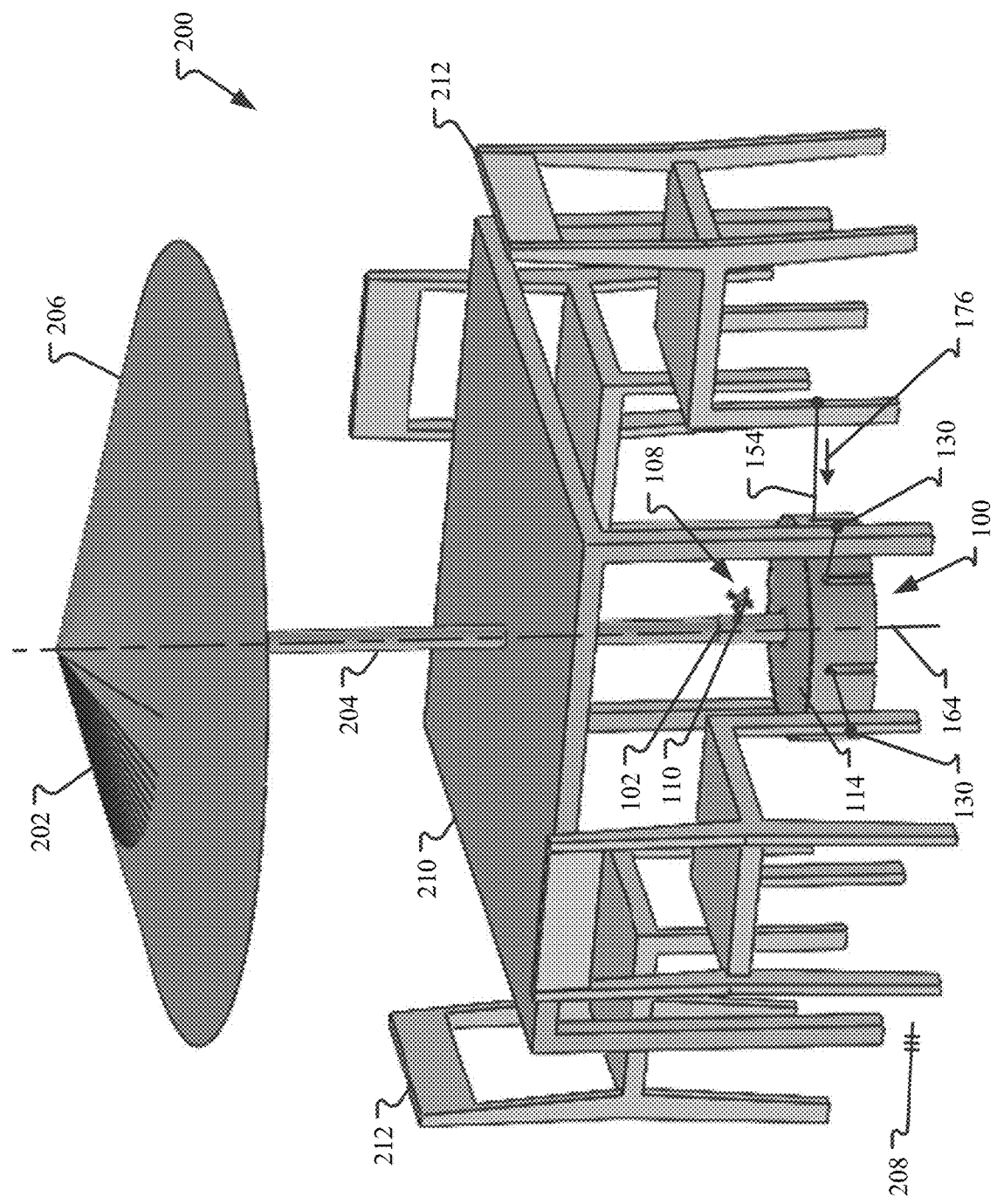
FIG. 9 is a perspective view of the umbrella base in use with outdoor furniture.

FIG. 9 is a perspective view of the umbrella base 100 in use with outdoor furniture 200. The umbrella base 100 includes the elongated receiver 102 that defines the longitudinal axis 164. The elongated receiver 102 is configured to partially receive an umbrella 202, and more specifically, receive a pole 204 of the umbrella 202 so as to support the umbrella 202 along the longitudinal axis 164 and position a canopy 206 above an underlying surface 208, such as, a patio or a deck. The housing 114 is positioned on the underlying surface 208 via the bottom surface. The bottom surface is spaced from the top surface of the housing along the longitudinal axis 164, with the side wall of the housing being parallel to the longitudinal axis 164. The retractable straps 154 are configured to extend and retract radially from the longitudinal axis 164 such that the fastener device 130 can attach to the outdoor furniture 200. As illustrated in FIG. 9, the umbrella base 100 is positioned underneath a table 210 and the fastener devices 130 are attached to chairs 212 and the table 210. In this configuration, the chairs 212 and the table 210 are weighted down for windy conditions by the umbrella base 100 so that they will not blow away. It should be appreciated that the umbrella 202 does not need to be supported by the umbrella base 100 in order to attach the chairs 212 and table 210 thereto. Additionally, outdoor furniture 200 can include other types of furniture as required or desired. The outdoor furniture 200 need not include specific attachment points, as the fastener device 130 is shaped and sized to attach to multiple different locations on the frame.

The retractable straps 154 are circumferentially spaced around the longitudinal axis 164 so that outdoor furniture 200 may be attached from any direction relative to the umbrella base 100. The retractable straps 154 also extend radially relative to the longitudinal axis 164. As such, a radial retention force 176 is being applied via the retractable strap 154 so as to hold the outdoor furniture 200 towards the umbrella base 100 and restrict the outdoor furniture from moving along the underlying surface 208 in windy conditions. The fastener device 130 is disposed above the underlying surface 208 and attaches to the outdoor furniture 200 at a location above the underlying surface 208 so as to reduce the outdoor furniture 200 from tipping over in windy conditions. By using the umbrella base 100 to hold down outdoor furniture 200 in windy conditions, loose tie downs like bungee straps do not need to be used and which can get easily lost. Additionally, extra weighted components are not needed for the outdoor furniture 200.

In the example, the retention system is disposed at least partially with a cavity formed by the multi-piece housing 114. This construction reduces dirt and debris from accumulating at the retention system. In other examples, the bottom surface may include a cavity formed therein that is configured to house the retention system closer to the underlying surface 208 and as described herein.

Figure 10:
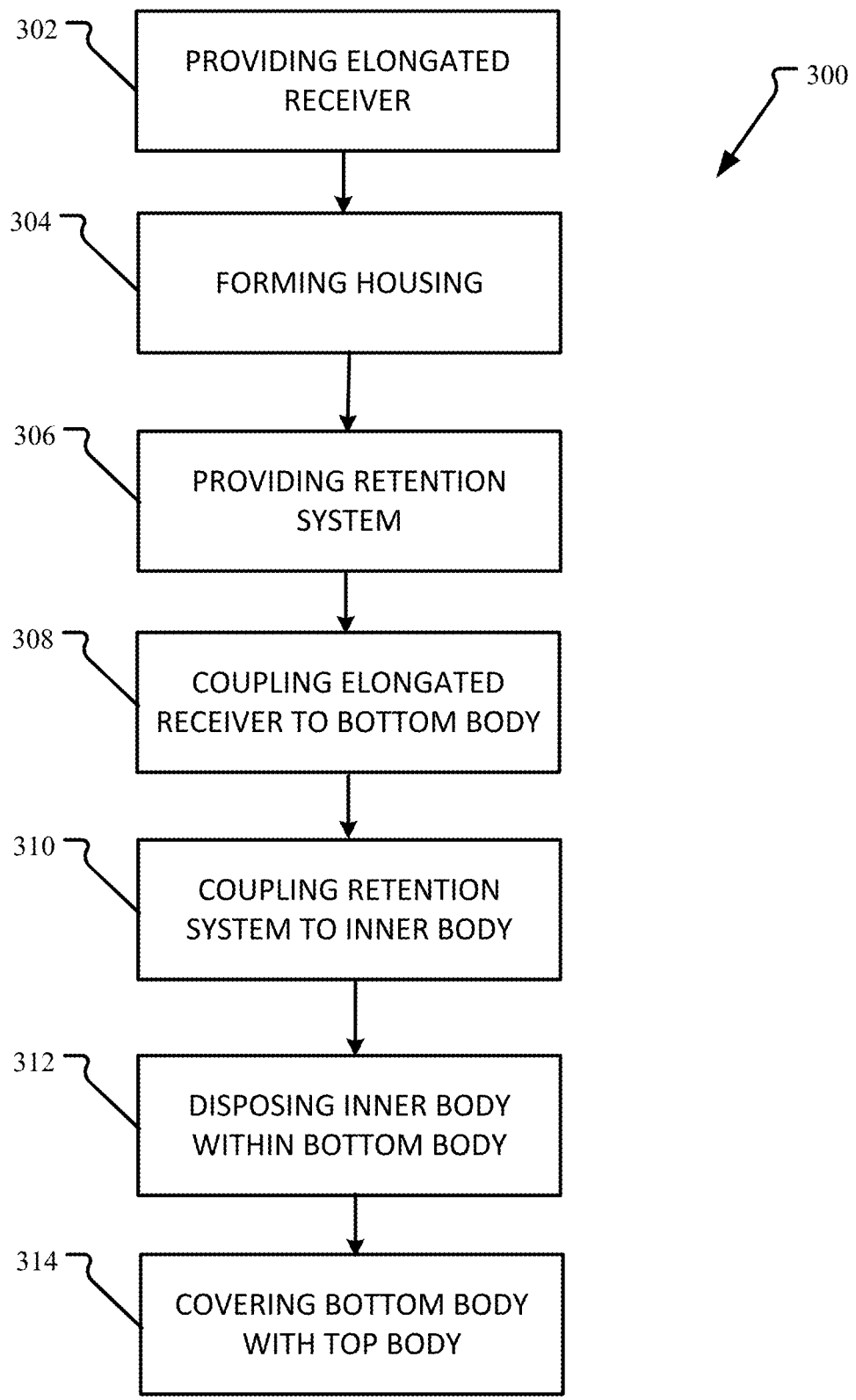
FIG. 10 illustrates a flowchart of an exemplary method of assembling an umbrella base.

FIG. 10 illustrates a flowchart of an exemplary method 300 of assembling an umbrella base. The example methods and operations can be implemented or performed by the systems and devices described herein (e.g., umbrella base 100). The method 300 begins with providing an elongated receiver configured to at least partially receive an end of a pole of an umbrella (operation 302). A housing is formed (operation 304). In an aspect, the housing includes a bottom body defined a bottom surface configured to be placed directly on an underlying surface, a top body defining a top surface and a side wall, and an inner body. Additionally, a retention system is provided (operation 306). In an aspect, the retention system includes a plurality of fastener devices adapted to selective and retractably extend.

The elongated receiver is coupled to the bottom body (operation 308). For example, one end of the elongated receiver is coupled to a bottom wall of the bottom body via a threaded collar. Additionally, the retention system is coupled to the inner body (operation 310). The inner body is then disposed within an interior cavity at least partially formed by the bottom body (operation 312), and the bottom body is covered by the top body (operation 314). When the bottom body is covered by the top bottom, the elongated receiver at least partially extends from the top surface of the top body and the plurality of fastener devices are disposed on an exterior of the side wall. In some examples, the method may further include disposing one or more weights between the inner body and the bottom body.

The umbrella base described above is used to support a patio umbrella in its upright orientation and selectively retain other outdoor furniture via the retention system. In other examples, a user may wish to continue to use an existing weighted umbrella base while still obtaining the benefits of the retention system described herein. As such, the retention system can be housed in other housing embodiments. For example, the retention patio leash described below has a housing that is configured to be mounted to an umbrella pole while enabling the plurality of fastener devices to be extended and attached to the adjacent outdoor furniture. The retention patio leash housing need not be weighted as the existing umbrella base is used for the hold down weight. As such, the retention patio leash is lighter and easier to move around. Additionally, the retention patio leash housing may mount to other outdoor furniture, and thus, versatility is increased and a patio umbrella is not necessarily needed for use.

Figure 11:
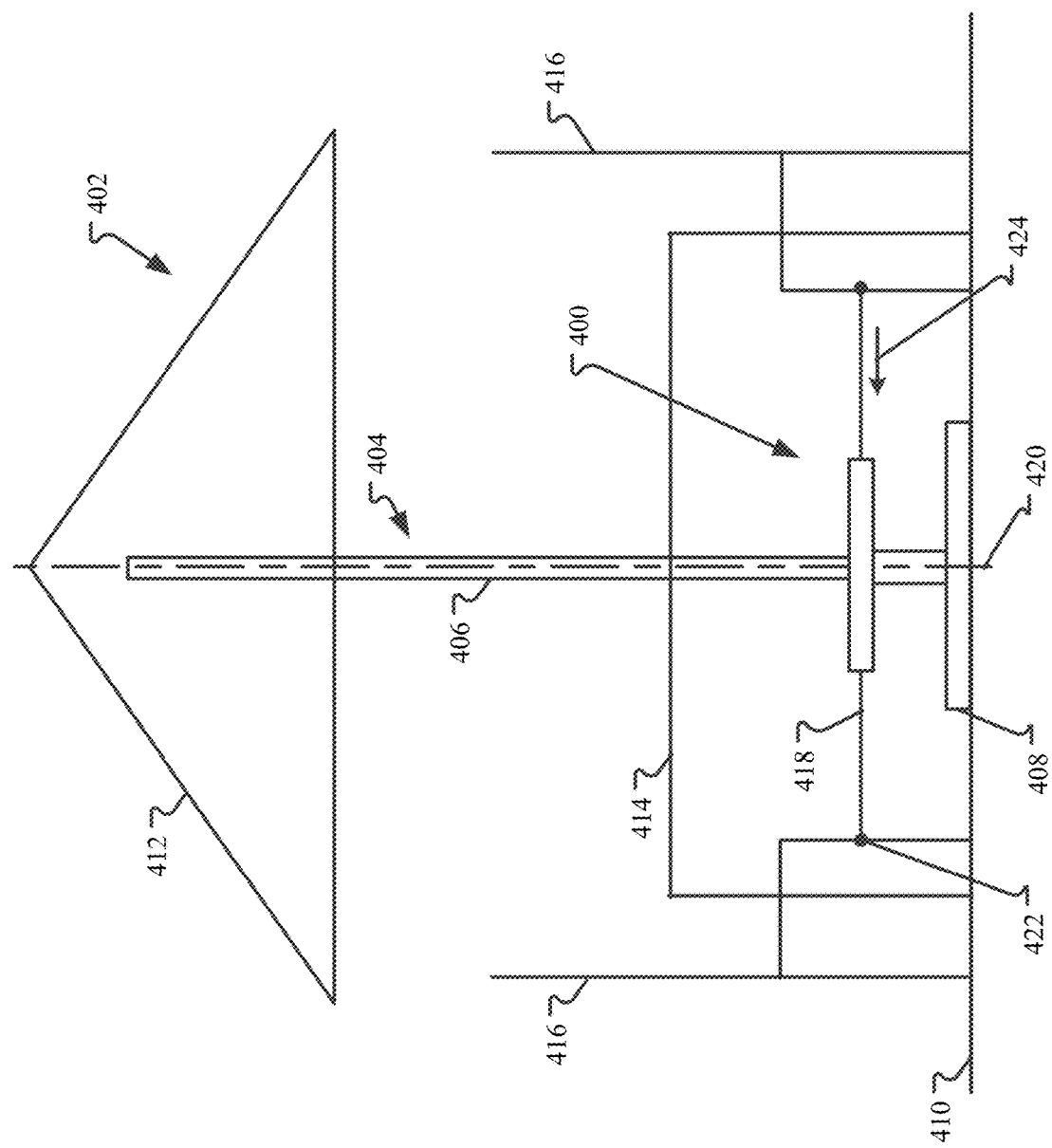
FIG. 11 is a schematic view an exemplary retention patio leash in use with outdoor furniture.

FIG. 11 is a schematic view an exemplary retention patio leash 400 in use with outdoor furniture 402. The outdoor furniture 402 includes an umbrella 404 having a pole 406 supported on an umbrella base 408 that is sitting on an underlying surface 410 and a canopy 412. The umbrella base 408 may be positioned underneath a table 414 having a plurality of chairs 416. It is appreciated that outdoor furniture 402 can include any other types of furniture as required or desired. In the example, the umbrella base 408 is configured to support the umbrella 404 in an upright manner and as known to one of ordinary skill in the art. As such, the umbrella base 408 may be weighted and/or have an increased footprint so as to support the umbrella 404 in a cantilever type manner.

The retention patio leash 400 is configured to be coupled to the pole 406 of the umbrella 404 and/or the umbrella base 408 so as to use the existing umbrella base 408 for weighted support. By coupling the retention patio leash 400 to the outdoor furniture 402, the retention patio leash 400 can be used with existing outdoor furniture 402 and existing aesthetics can be retained, and new weighted support members need not be purchased. The retention patio leash 400 includes a plurality of retractable straps 418 that are configured to extend and retract radially from a longitudinal axis 420 such that a fastener device 422 can attach to the outdoor furniture 402 and hold down the outdoor furniture from environmental conditions, such as wind.

In the example, the retractable straps 418 are circumferentially spaced around the longitudinal axis 420 so that the outdoor furniture 402 may be attached from any direction relative to the retention patio leash 400 and the umbrella 404. The retractable straps 418 also extend radially relative to the longitudinal axis 420. As such, a radial retention force 424 is being applied via the retractable strap 418 so as to hold the outdoor furniture 402 towards the umbrella base 408 and restrict the outdoor furniture 402 from moving along the underlying surface 410 in windy conditions. The fastener device 422 is disposed above the underlying surface 410 and attaches to the outdoor furniture 402 at a location above the underlying surface 410 so as to reduce the outdoor furniture 402 from tipping over in windy conditions. By coupling the retention patio leash 400 to the umbrella base 408 to hold down the outdoor furniture 402 in windy conditions, loose tie downs like bungee straps do not need to be used and which can get easily lost. Additionally, extra weighted components are not needed for the outdoor furniture 402.

As illustrated in FIG. 11, the chairs 416 and the table 414 are weighted down for windy conditions by the umbrella base 408 via the retention patio leash 400 so that they will not blow away. The outdoor furniture 402 need not include specific attachment points, as the fastener device 422 is shaped and sized to attach to multiple different locations on the frame (e.g., chair leg, table leg, etc.). As described herein, the retention patio leash 400 is described as being configured to couple to the umbrella 404 so that the retention patio leash 400 can utilize an existing umbrella base 408 as a weighted member and hold down the outdoor furniture 402. It should be appreciated that the retention patio leash 400 can couple to any other weighted member or secured location and be used to hold down the outdoor furniture 402. For example, the retention patio leash 400 may be coupled to a table leg, a fireplace leg, a column for an overhang, etc.

Figure 12:
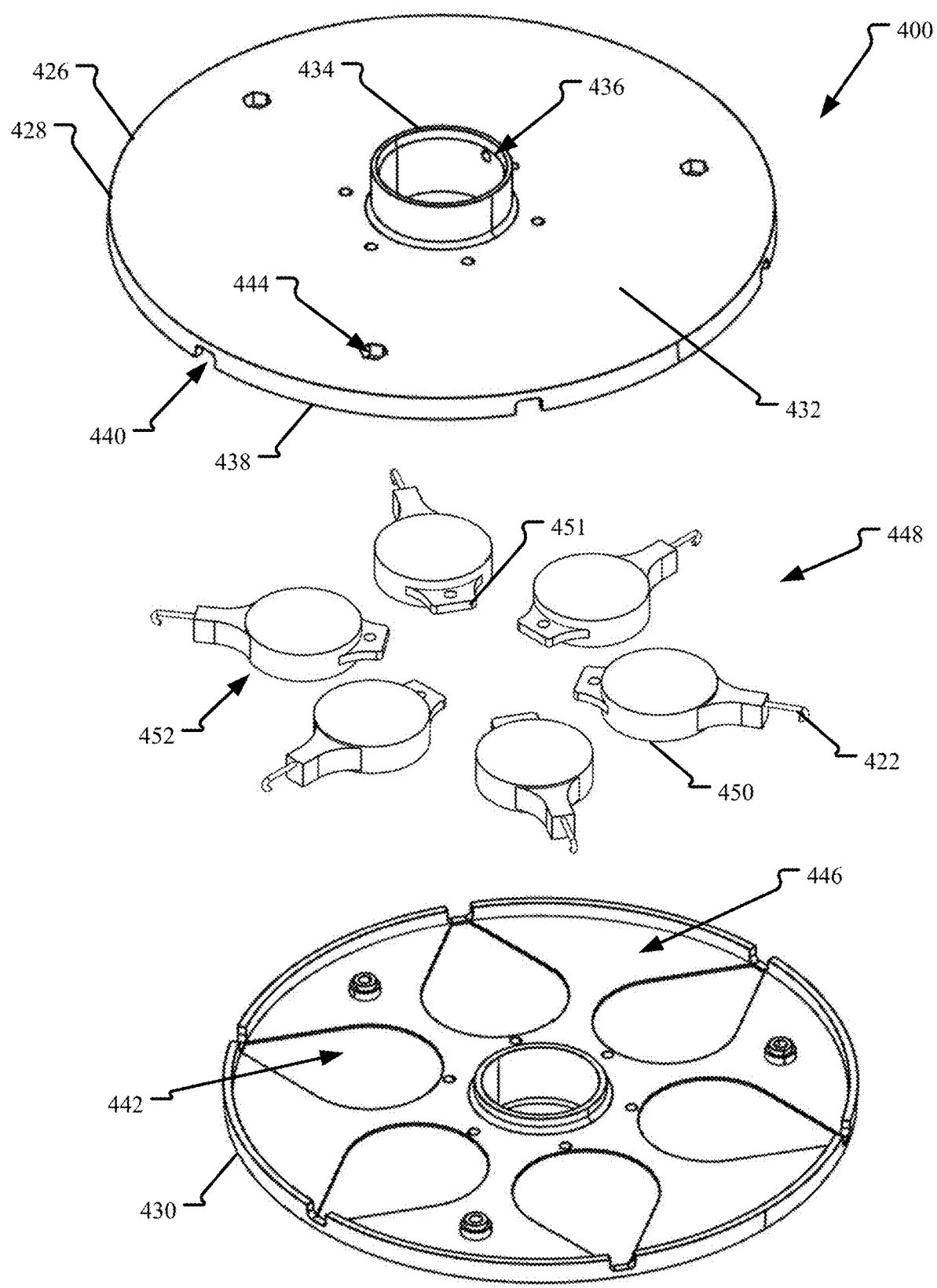
FIG. 12 is an exploded, perspective view of the retention patio leash.

FIG. 12 is an exploded, perspective view of the retention patio leash 400. The retention patio leash 400 includes a housing 426 formed from a first body 428 and a second body 430 configured to couple together. In an aspect, the first body 428 is identical to the second body 430 to facilitate manufacturing efficiencies. In an example, the housing 426 may be formed from an injection molded plastic based material. Each body 428, 430 has a disc 432 having a collar 434 extending from one side. The collar 434 defines a through opening and is configured to receive the pole from the umbrella and couple thereto. In other examples, the collar 434 may receive a table leg or the like. An aperture 436 is defined in the collar 434 so that a retention screw (e.g., a threaded bolt and knob 110 shown in FIG. 9) can be used to releasably secure the housing 426 to the outdoor furniture. As such, the housing 426 can be selectively positioned along the height of the outdoor furniture as required or desired. In an example, the collar 434 may have an inner diameter of about 2.5 inches and extend away from the disc 432 about 1 inch.

A flange 438 extends from the disc 432 on the opposite side from the collar 434 and forms a sidewall of the housing 426 when coupled to the opposing flange. The flange 438 extends around an outer perimeter of the disc 432. In an example, the flange 438 may have an outer diameter of about 13.5 inches and extend away from the disc 432 about 0.5 inches. A plurality of recesses 440 are defined in the flange 438 and circumferentially spaced therearound. A plurality of channels 442 are defined on the disc 432 and on the side that the flange 438 is on. The channels 442 are aligned with the recesses 440. The disc 432 can include one or more fastener openings 444 so that the bodies 428, 430 can be coupled to each other (e.g., via a bolt, not shown).

In operation, when the bodies 428, 430 are coupled to each other, an interior cavity 446 is defined so as to receive a retention system 448 supported by the housing 426. The retention system 448 includes one or more fastener devices 422 that are configured to selectively extend outward from the housing 426 via the retractable straps 418 (shown in FIG. 1) and releasably attach to outdoor furniture. The fastener device 422 is any type of connection member that can releasably attach to outdoor furniture. As illustrated, the fastener device 422 includes a hook. In other examples, the fastener device can include a snap hook, an adjustable strap like a hook and loop fastener, an elastic member, or the like. The fastener device 422 is configured to attach to a portion of the outdoor furniture such as a leg of a table or chair, an arm rest of a chair, a frame of a table, or any other component of the outdoor furniture as required or desired.

In the example, the retention system 448 includes a plurality of fastener devices 422 spaced circumferentially around the flange 438. This configuration enables multiple pieces of outdoor furniture to be attached to the housing 426. The retention system 448 include a plurality of retractable straps 418 with each of the retractable straps 418 having the fastener device 422 coupled to a free end. The retractable straps 418 are housed within a case 450 that secures to the housing 426 (e.g., via fasteners—not shown) via a tab 451 with an aperture. The case 450 may be disposed within the channels 442 defined within the interior cavity 446. The fastener device 422 is disposed on the opposite side of the case 450 from the tab 451 and so that the radial retention force is transferred through the case 450 and into the housing 426. In the example, the tab 451 is positioned at a middle height relative to the height of the case 450. The case 450 restricts or prevents dirt and debris from accumulating within the retractable straps 418 and reduces wear thereof.

In the example, the housing 426 is configured to support six cases 450, although more or less cases 450 can be used as required or desired. The retractable straps 418 enable the fastener devices 422 to be positioned at least partially exterior of the flange 438 and selectively and retractably extend outwards so as to releasably attach to outdoor furniture. The retractable straps 418 also enable the fastener device 422 to be automatically retracted towards the housing 426 upon release from the outdoor furniture. Additionally, each case 450 is discrete and independent from each other. As such, each fastener device 422 can be independently used as required or desired. In other example, portions of the retention system 448 may be coupled together so that movement of other fastener devices 422 correspond to one another. The case 450, fastener device 422, and the retractable straps 418 may be generally referred to as a retention device 452.

The case 450 of the retention device 452 can include a reel that the retractable strap 418 is wound about and that enables the fastener device 422 to automatically retract towards the housing 426 upon release from the outdoor furniture. The case 450 can be attached within the inner cavity via one or more fasteners (e.g., screws—not shown) at the tab 451 and with one or both of the first and second bodies 428, 430. In some examples, the reel can generate a retraction force on the retractable strap 418 such that tension is always applied on the strap when extended, and thus, tension is applied to the outdoor furniture when coupled thereto and assist in holding down the furniture in windy conditions. As such, when the fastener device 422 is released in an extended position, the retractable strap 418 automatically retracts into the case 450. In other examples, the reel can include a ratcheting mechanism so that the retractable strap 418 can be extended and have its extended length maintained. Once the retractable strap 418 is released from the ratcheting mechanism (e.g., via a pulling motion), the strap can automatically retract. It should be appreciated, that any other reel mechanism for the retractable strap 418 can be used as required or desired.

The retention system 448 is disposed at least partially within the housing 426 so as to reduce the number of components that project from the housing 426. In the example, the recesses 440 may not extend the entire height of the flange. In other examples, the recess 440 may extend all the way to the disc 432. By having the housing 426 couple to existing outdoor furniture for use, when the retention patio leash 400 is not in use, it can be easily stored away.

In the example, the housing 426 is configured to not be weighted with excess mass so that the outdoor furniture that the retention patio leash 400 is coupled to provides the weight to restrict or prevent the outdoor furniture from moving around when connected. In other examples, the interior cavity 446 of the housing 426 may be configured to receive one or more weights to provide additional mass to the housing 426 and for further weight to restrict or prevent the outdoor furniture from moving around. For example, the interior cavity 446 can be at least partially filled with water, sand, and/or weighted plates in order to provide mass to the housing 426. In another aspect, the housing 426 may be formed from a dense material (e.g., cast iron or the like) in order to add mass to the housing 426.

Figure 13:
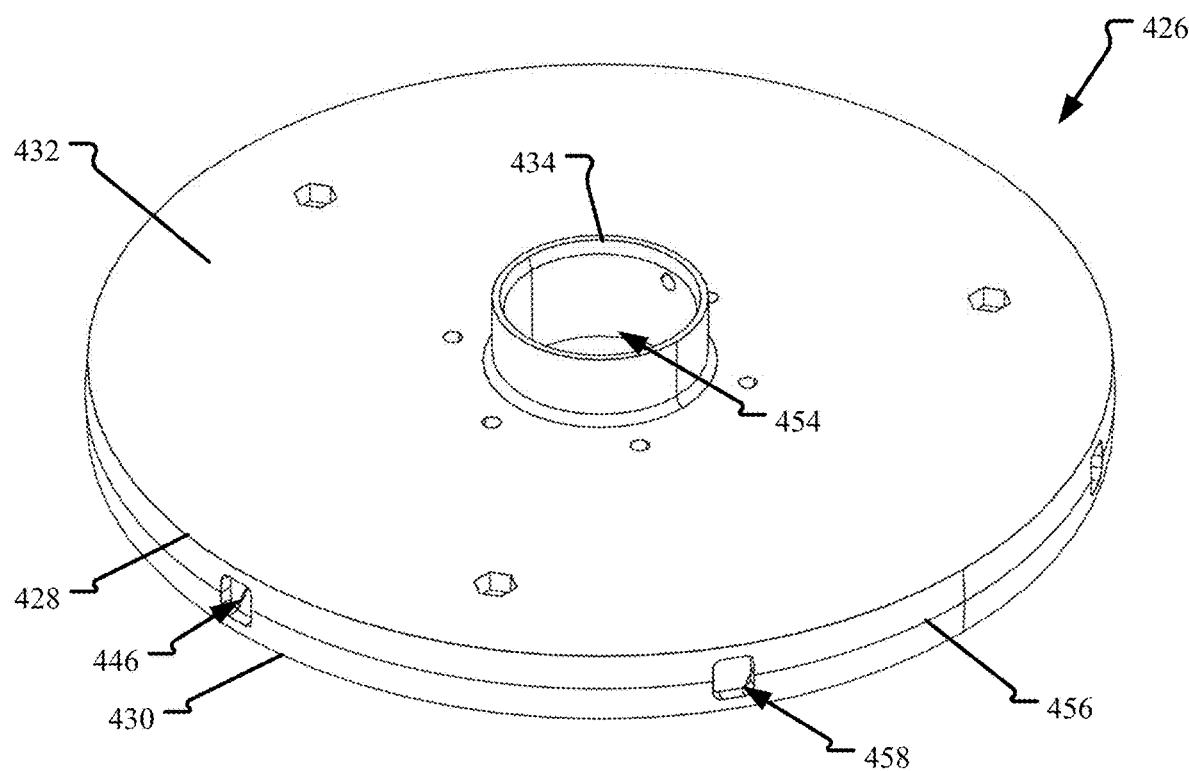
FIG. 13 is a top perspective view of a housing of the retention patio leash.
Figure 14:
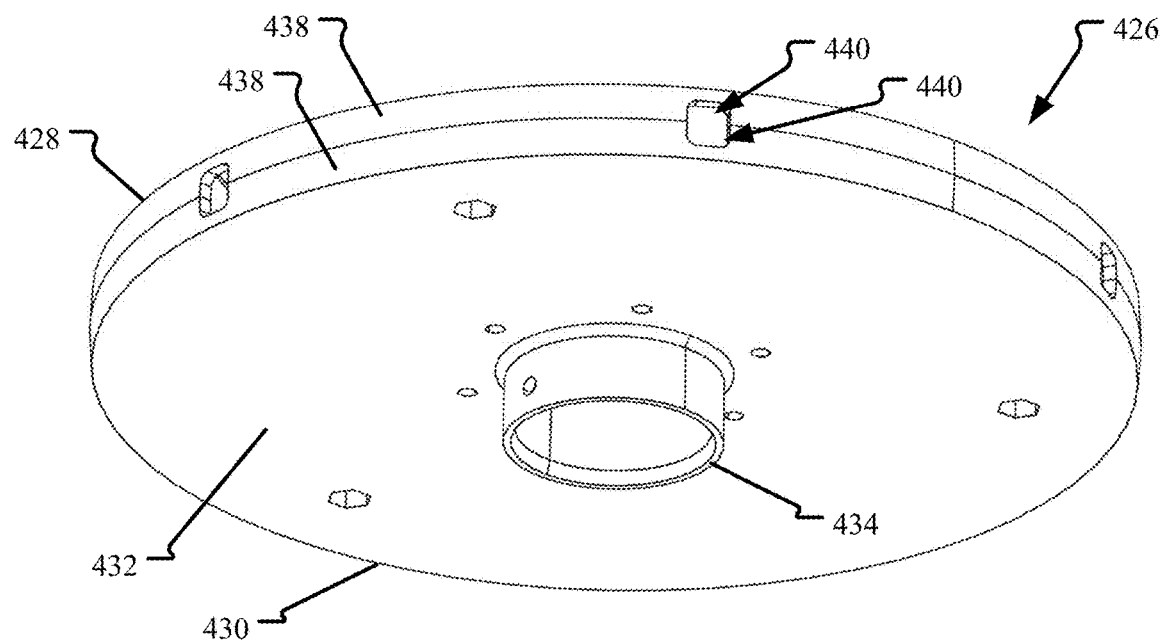
FIG. 14 is a bottom perspective view of the housing of the retention patio leash.

FIG. 13 is a top perspective view of the housing 426 of the retention patio leash 400 (shown in FIG. 12). FIG. 14 is a bottom perspective view of the housing 426. Referring concurrently to FIGS. 13-14, the housing 426 is formed by the first body 428 being coupled to the second body 430. The collars 434 of each body 428, 430 align along the longitudinal axis 420 (shown in FIG. 11) so that a through opening 454 is defined in the housing 426 and that is sized and shaped to receive the pole of the umbrella or other outdoor furniture component. In the example, the through opening 454 is separated and independent from the interior cavity 446 defined by the discs 432 and the flanges 438.

The flanges 438 of each body 428, 430 align to form a sidewall 456 of the housing 426 and the recesses 440 open to one another such that a plurality of slots 458 are defined in the sidewall 456. The slots 458 facilitate the retractable straps 418 (shown in FIG. 11) extending through the sidewall 456 and enable operation of the retention system 448 (shown in FIG. 12) described herein.

Figure 15:
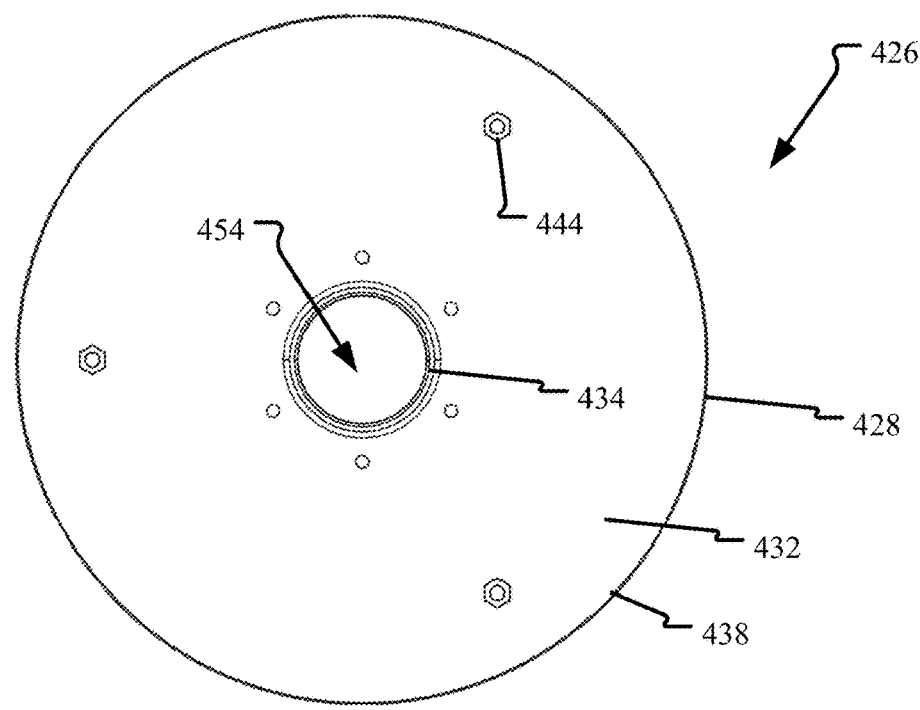
FIG. 15 is a top view of the housing of the retention patio leash.
Figure 16:
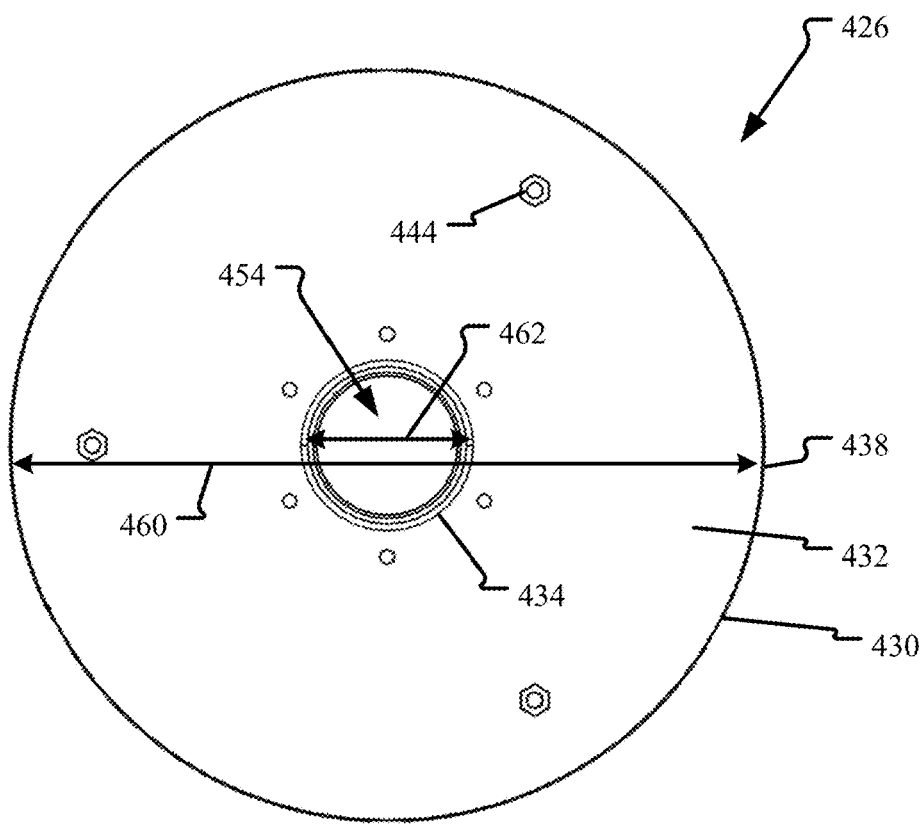
FIG. 16 is a bottom view of the housing of the retention patio leash.

FIG. 15 is a top view of the housing 426. FIG. 16 is a bottom view of the housing 426. Referring concurrently to FIGS. 15 and 16, the collars 434 define the through opening 454 so that the housing 426 can receive and be coupled on a portion of the outdoor furniture. For example, the umbrella pole may be what the housing 426 is coupled to. The housing 426 is substantially symmetrical about the two bodies 428, 430 of the housing 426. The discs 432 with the flanges 438 form a substantially cylindrical shape that forms the interior cavity. The flanges 438 have an outer diameter 460 that is larger than an outer diameter 462 of the collars 434. Additionally, the fastener openings 444 align so that fasteners can be used to secure the first and second bodies 428, 430 together. The fastener openings 444 are circumferentially spaced and disposed between the collar 434 and flange 438 so that connection strength is facilitated.

Figure 17:
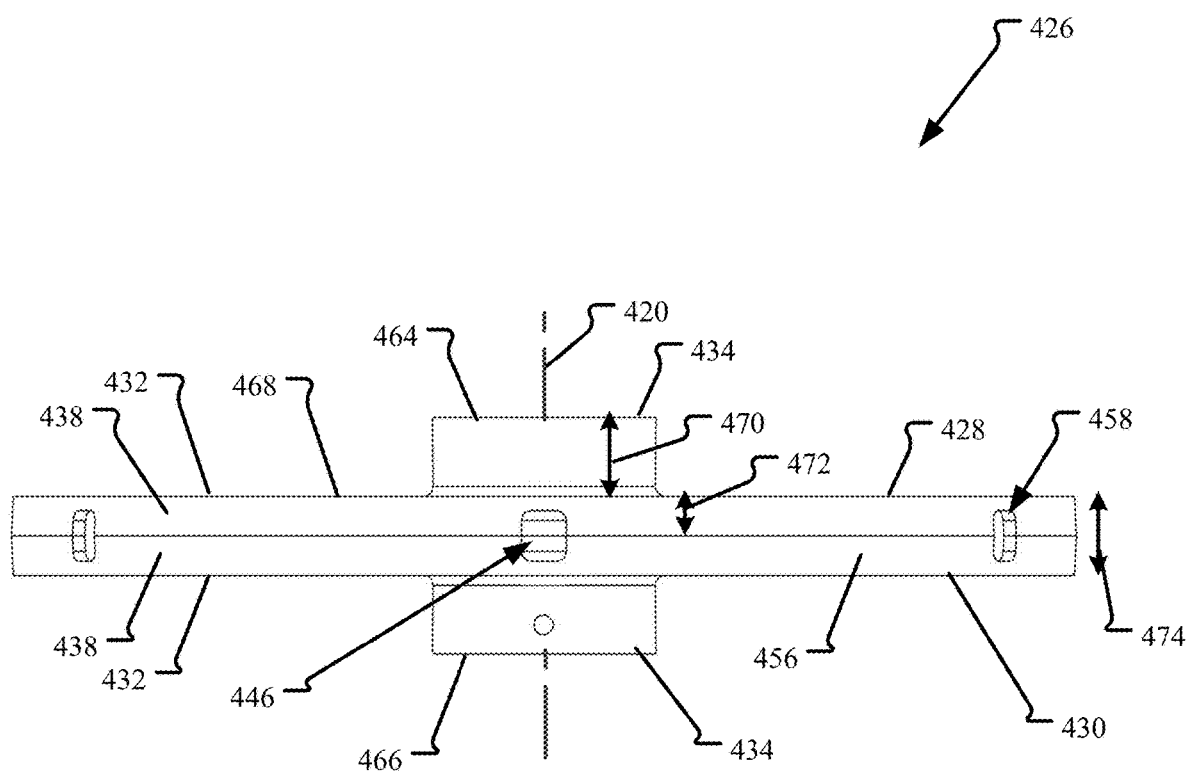
FIG. 17 is a side view of the housing of the retention patio leash.

FIG. 17 is a side view of the housing 426. The centerline of the collars 434 define the longitudinal axis 420. The collar 434 of the first body 428 forms a first end 464 of the housing 426 while the collar 434 of the second body 430 forms a second end 466 of the housing 426. The ends 464, 466 extending along the longitudinal axis 420. The discs 432 and the flanges 438 of each of the bodies 428, 430 face each other and define the interior cavity 446. The discs 432 and the flanges 438 define an intermediate disc body 468 disposed between the first and second ends 464, 466 and with the slots 458 for the retention system 448 (shown in FIG. 12).

In the example, the collar 434 has an axial length 470 from the disc 432 that is longer than an axial length 472 of the flange 438 from the disc 432. An axial length 474 of the sidewall 456 (e.g., the two flanges 438 stacked together) may about equal to or larger than the axial length of the collar 434. This configuration of the housing 426 facilitates attaching to the umbrella pole while also facilitating support of the retention system 448. By having the collars 434 elongated securement to the umbrella pole is facilitated while also restricting or preventing tilting of the housing 426 when in use.

By using two identical bodies 428, 430 manufacturing efficiencies are increased. In other examples, the two bodies 428, 430 may not be the same configuration. For example, the housing may only have one collar 434 so that one of the discs 432 can lay flat (e.g., on the ground or against the outdoor furniture). The collar 434 may be configured to receive a portion of the umbrella base and couple directly thereto. The collar 434 may be configured to receive a leg of a table or chair. The collar 434 may be configured to receive an end of a leg of a table or chair and have the housing 426 be positioned directly on the ground.

It should be appreciated, that FIGS. 13-17 show only one possible example of the housing 426, and the housing 426 can take on a variety of shapes and sizes while still enabling the retention patio leash 400 to function as described herein. For example, the housing 426 can include one or more handles (not shown). In still another example, the collar 434 may be off-center relative to the disc 432. In other examples, the housing 426 can be square-shaped, dome-shaped, cross-shaped, or the like. In yet another example, the housing may be split about a transverse plane relative to the outer diameter and the two housing components may couple around a pole or leg of the outdoor furniture so that the housing does not need to slide along the pole or leg.

Figure 18:
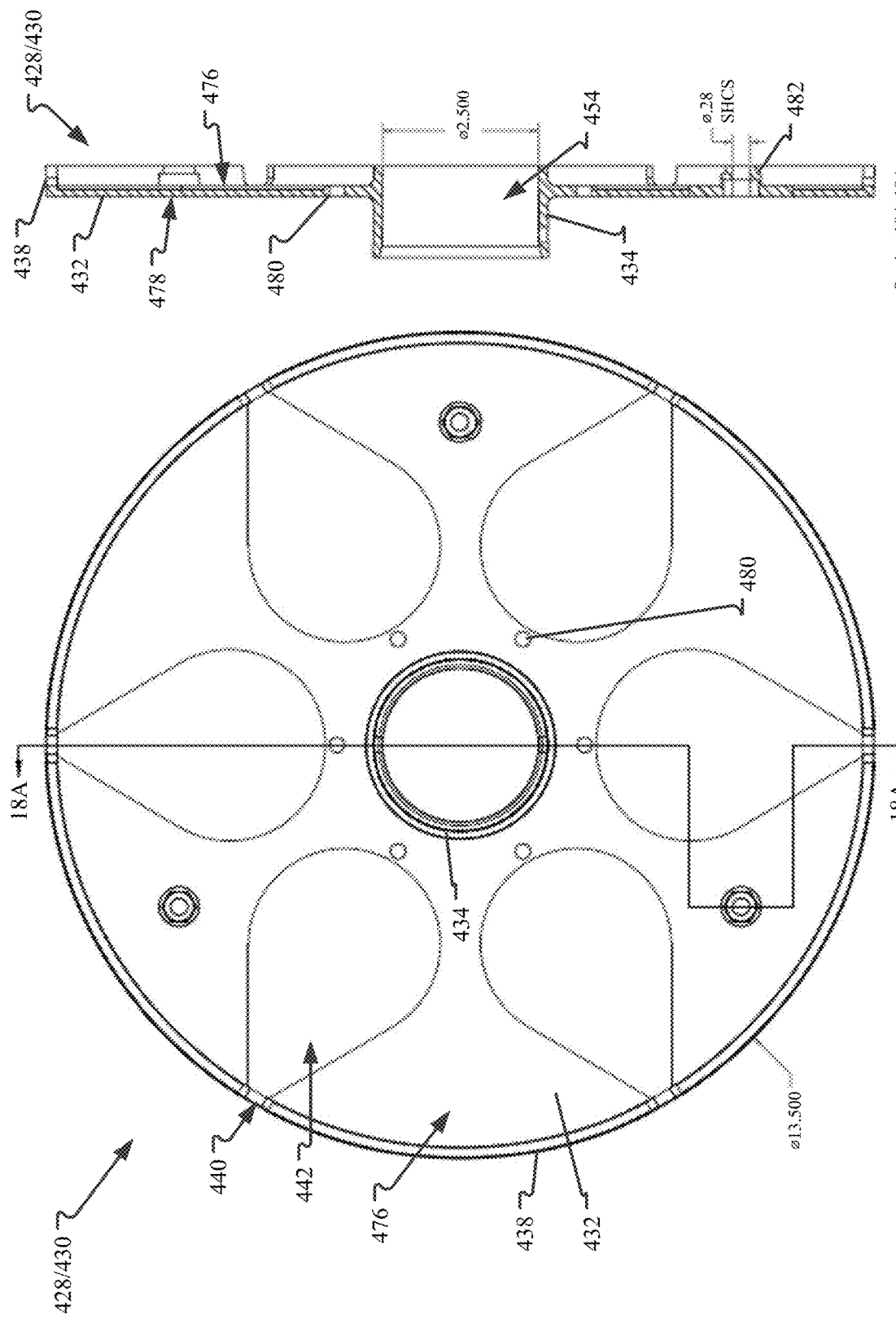

FIG. 18 is an interior view and FIG. 18A is a cross-sectional view taken along line 18A-18A of one of the housing bodies 428, 430. Each body is formed from the disc 432 having an inner surface 476 and an outer surface 478. The flange 438 extends from an outer perimeter of the inner surface 476 and includes recesses 440. The recesses 440 are radially aligned with the channels 442 defined within the inner surface 476. The channels 442 are shaped and seized to at least partially receive the case 450 of the retention system 448 (both shown in FIG. 12). The channels 442 are shallow when compared to the flange 438 and so that the interior cavity formed by the housing is substantially devoid of structure (and thus weight) other than the retention system 448. As such, the channels 442 are recessed less than the thickness of the case 450. Proximate each channel 442 the inner surface 476 includes a fastener location 480 configured to enable the case 450 to couple to one or both of the housing bodies 428, 430. In an example, the fastener location 480 may be a hole through the disc 432.

A plurality of interior posts 482 also extend from the inner surface 476 of the disc. The interior posts 482 are configured to align with each other when the housing is assembled and allow fasteners to extend therethrough. In an example, the outer surface 478 of the disc 432 includes a countersunk bore at the posts 482 so that the fasteners are recessed within the disc 432. The collar 434 extends from the outer surface 478, and in the example, at least a portion of the collar 434 can also extend from the inner surface 476. As such, when the housing 426 is assembled, the through opening 454 defined by the collar 434 is separated from the interior cavity 446.

Figure 19:
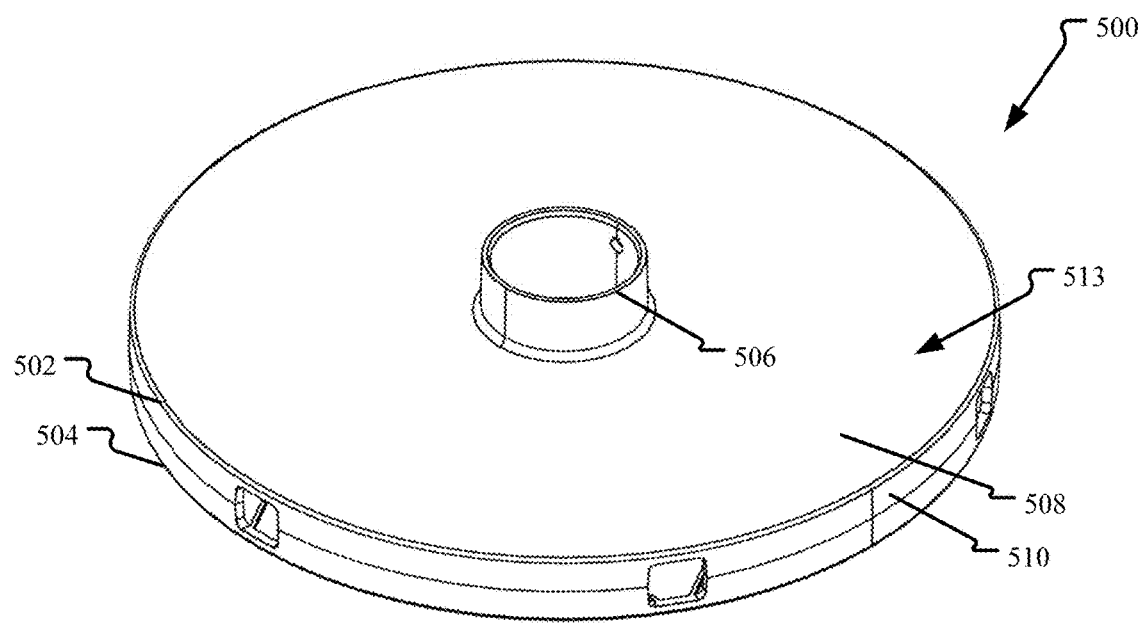
FIG. 19 is a perspective view of another housing for the retention patio leash shown in FIGS. 12-18.
Figure 20:
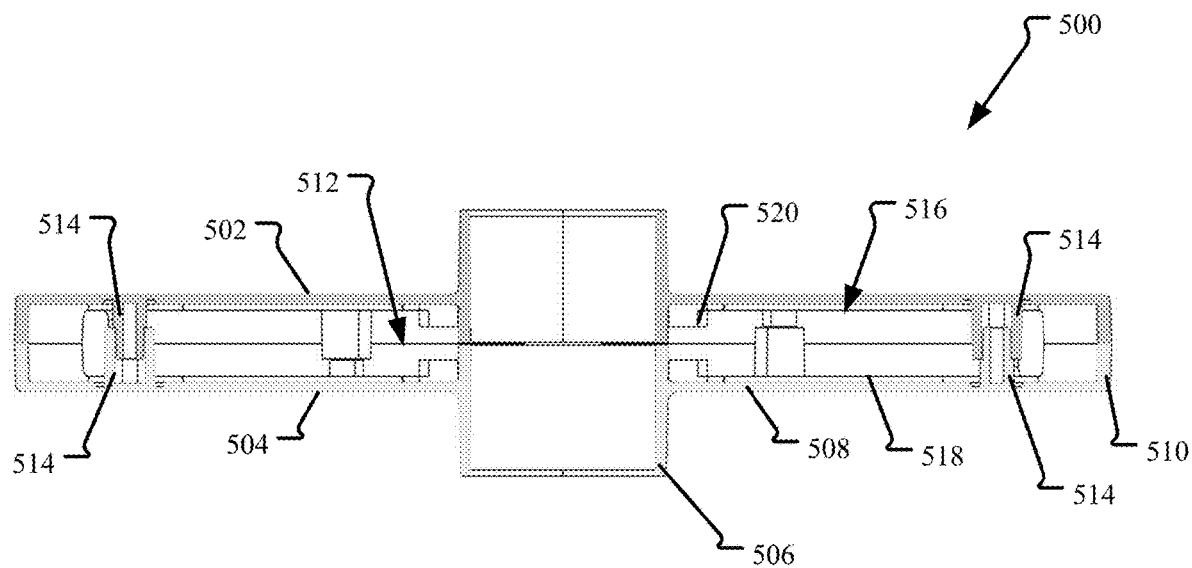
FIG. 20 is a cross-sectional view of the housing shown in FIG. 19.

FIG. 19 is a perspective view of another housing 500 for the retention patio leash 400 (shown in FIGS. 12-18). FIG. 20 is a cross-sectional view of the housing 500. Referring concurrently to FIGS. 19 and 20, the housing 500 is configured for use with the retention system 448 described above, and thus, the retention system will not be described further below. Similar to the housing 426 described above, the housing 500 is formed from a two-piece body 502, 504. The bodies 502, 504 have a collar 506, a disc 508, and a flange 510 such that an interior cavity 512 is formed. In this example, however, an outer surface 513 of the disc 508 is free from any holes, bores, fasteners, etc. and is a substantially smooth surface providing enhanced aesthetics.

To facilitate coupling the bodies 502, 504 together, each body includes a plurality of interior posts 514 extending from an inner surface of the disc 508. Some of the posts 514 may be male posts while other posts 514 are female posts so that the bodies 502, 504 can be coupled together. In an example, the posts 514 form a snap or a press fit connection. The male and female posts alternate on the bodies 502, 504 so that the bodies are still identically formed, just rotated relative to one another when secured together.

Additionally, channels 516 formed on the inner surface of the disc 508 for the cases of the retention system 448 are formed with a wall 518 that projects from the inner surface. By using a small wall, the thickness of the disc 508 can be maintained thereby increasing strength. A fastener location 520 for the cases are formed with projections extending from the inner surface. In the example, the fastener location 520 has a higher height within the interior cavity 512 than the walls 518.

The retention patio leash described above is configured to be coupled to an umbrella pole, although other outdoor furniture components are also contemplated herein. By coupling the retention patio leash directly to the outdoor furniture, the retention patio leash can be used with existing outdoor furniture and existing aesthetics can be retained and new weighted support members need not be purchased. The retention patio leash includes a plurality of retractable straps that are configured to extend and retract so that fasteners can attach to the outdoor furniture and hold down the outdoor furniture from environmental conditions, such as wind.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

While various embodiments have been described for purposes of this disclosure, various changes and modifications may readily suggest themselves to those skilled in the art and may be made which are well within the scope of the present disclosure.

What is claimed is:

1. A retention patio leash for outdoor furniture comprising:
    a housing having a first end and an opposite second end defining a longitudinal axis, the housing including:
        a first collar disposed at the first end;
        a second collar disposed at the second end, the first and second collars defining a through opening configured to receive at least a portion of the outdoor furniture; and
        an intermediate disc body disposed between the first collar and the second collar, the intermediate disc body defining an internal cavity and a plurality of slots defined on a sidewall; and
    a retention system supported within the intermediate disc body, the retention system including:
        one or more retractable straps mounted to the housing at a respective slot of the plurality of slots on the sidewall; and
        a fastener coupled to a free end of each of the one or more retractable straps and configured to releasably attach to other outdoor furniture, wherein the fastener is adapted to selectively extend outwards from the housing via the one or more retractable straps.

2. The retention patio leash of claim 1, wherein the through opening of the housing is configured to releasably couple to an umbrella pole.

3. The retention patio leash of claim 1, wherein the housing includes a first body coupled to a second body, the first body being identical to the second body.

4. The retention patio leash of claim 3, wherein the first body and the second body include interior posts disposed within the internal cavity, the interior posts coupled together forming the housing.

5. The retention patio leash of claim 1, wherein the housing is not weighted.

6. The retention patio leash of claim 1, wherein each of the one or more retractable straps has a case that is disposed within the internal cavity.

7. The retention patio leash of claim 6, wherein the intermediate disc body has an inner surface defining a plurality of channels configured to receive at least a portion of the case.

8. A retention patio leash for outdoor furniture comprising:
    a first body having a first disc with a first collar extending from one side and a first flange extending from an opposite side, a plurality of first recesses defined in the first flange;
    a second body having a second disc with a second collar extending from one side and a second flange extending from an opposite side, a plurality of second recesses defined in the second flange, wherein the first body is coupled to the second body such that an interior cavity is formed by the first and second discs and the first and second flanges with the first and second recesses forming a plurality of circumferentially spaced slots; and
    a retention system supported within the interior cavity, the retention system including:
        a plurality of retractable straps, each strap extending through a respective slot of the plurality of circumferentially spaced slots;
        a fastener coupled to one end of each of the plurality of retractable straps, the fastener configured to releasably attach to the outdoor furniture; and a case coupled to an opposite end of each of the plurality of retractable straps, the case disposed within the interior cavity and secured to one or both of the first and second discs.

9. The retention patio leash of claim 8, wherein the first and second collars define a through opening, the through opening separated from the interior cavity.

10. The retention patio leash of claim 9, wherein the through opening is sized and shaped to receive an umbrella pole.

11. The retention patio leash of claim 8, wherein the first collar is axially longer than the first flange and the second collar is axially longer than the second flange.

12. The retention patio leash of claim 8, wherein the first body is identical to the second body.

13. The retention patio leash of claim 8, wherein the first body includes at least one first post extending from the side of the first disc that the first flange extends from and the second body includes at least one second post extending from the side of the second disc that the second flange extends from, the at least one first post configured to couple to the at least one second post for securing the first body to the second body.

14. The retention patio leash of claim 8, wherein the first and second discs include a plurality of channels configured to at least partially receive the case of the retention system.

15. A retention patio leash for outdoor furniture comprising:
a housing defined by a first body and a second body, the housing including:
a first collar and a second collar defining a longitudinal axis and a through opening in the housing;
a first disc extending from the first collar and a second disc extending from the second collar, the first disc spaced apart from the second disc along the longitudinal axis; and
a sidewall extending between the first disc and the second disc, the sidewall defining a plurality of slots, wherein the housing defines an interior cavity separated from the through opening; and
a retention system supported within the interior cavity, the retention system including:
a plurality of retractable straps, each strap extending through a respective slot of the plurality of slots;
a fastener coupled to one end of each of the plurality of retractable straps, the fastener configured to releasably attach to the outdoor furniture; and
a case coupled to an opposite end of each of the plurality of retractable straps, the case disposed within the interior cavity and secured to one or both of the first and second discs.

16. The retention patio leash of claim 15, wherein an outer diameter of the sidewall is larger than an outer diameter of the first and second collars.

17. The retention patio leash of claim 15, wherein the first body is snap fit or press fit coupled to the second body.

18. The retention patio leash of claim 17, wherein the first body includes at least one first interior snap-fit post and the second body includes at least one second interior snap-fit post.

19. The retention patio leash of claim 15, further including a retention screw supported on the first collar or the second collar.

20. The retention patio leash of claim 15, wherein the first body and the second body are injection molded plastic components.

* * * * *